United States Patent
Minami

(10) Patent No.: US 9,700,983 B2
(45) Date of Patent: Jul. 11, 2017

(54) METHOD OF PROCESSING TEMPERED GLASS

(71) Applicant: CERON Technologies Inc., Tokyo (JP)

(72) Inventor: Hironori Minami, Kasuya Gun (JP)

(73) Assignee: CERON Technologies Inc., Tokyo (JP)

( * ) Notice: Subject to any disclaimer, the term of this patent is extended or adjusted under 35 U.S.C. 154(b) by 300 days.

(21) Appl. No.: 14/424,388

(22) PCT Filed: Aug. 30, 2013

(86) PCT No.: PCT/JP2013/073447
§ 371 (c)(1),
(2) Date: Feb. 26, 2015

(87) PCT Pub. No.: WO2014/034907
PCT Pub. Date: Mar. 6, 2014

(65) Prior Publication Data
US 2015/0225284 A1   Aug. 13, 2015

(30) Foreign Application Priority Data

Aug. 31, 2012   (WO) .................. PCT/JP2012/072137

(51) Int. Cl.
*B24B 7/24*   (2006.01)
*B24B 1/04*   (2006.01)
(Continued)

(52) U.S. Cl.
CPC ............... *B24B 1/04* (2013.01); *B24B 7/248* (2013.01); *B24B 9/10* (2013.01); *B24D 7/18* (2013.01);
(Continued)

(58) Field of Classification Search
CPC .. B24B 1/04; B24B 7/24; B24B 7/248; B24D 7/18; B28D 1/041; B28D 1/14;
(Continued)

(56) References Cited

U.S. PATENT DOCUMENTS 5,101,599 A *  4/1992  Takabayasi ........... B06B 1/0261
                                                    173/11
6,776,563 B2 *  8/2004  Shamoto ................. B23B 29/12
                                                    310/323.16
(Continued)

FOREIGN PATENT DOCUMENTS

JP   2002-160932 A   6/2002
JP   2002-346817 A   12/2002
(Continued)

OTHER PUBLICATIONS

International Search Report dated Dec. 3, 2013, issued in corresponding application No. PCT/JP2013/073447.

*Primary Examiner* — Eileen Morgan
(74) *Attorney, Agent, or Firm* — Westerman, Hattori, Daniels & Adrian, LLP

(57) ABSTRACT

To provide a method of processing a tempered glass in which a length of time required for manufacturing one plate of a product glass is significantly reduced while the quality of the product glass is secured. In the method of processing the tempered glass in which a stacked block (1a) acting as a chemical tempered glass (1) is processed by using a processing device (8) under a condition that the processing device (8) is rotated and vibrated, the stacked block (1a) is cut out from a stack (1A) acting as the chemical tempered glass (1) by using a dicing blade (84), prior to the processing of the stacked block (1a) by using the processing device (8), and a finishing to an outer periphery of the stacked block (1a) is also performed during the processing of the stacked block (1a) by using the processing device (8).

9 Claims, 37 Drawing Sheets

(51) Int. Cl.
    *B24B 9/10*     (2006.01)
    *C03B 33/037*     (2006.01)
    *C03B 33/10*     (2006.01)
    *G05B 13/02*     (2006.01)
    *B28D 1/14*     (2006.01)
    *C03C 17/00*     (2006.01)
    *G05B 19/418*     (2006.01)
    *B28D 1/04*     (2006.01)
    *B28D 5/02*     (2006.01)
    *B28D 5/04*     (2006.01)
    *B24D 7/18*     (2006.01)

(52) U.S. Cl.
    CPC ............... *B28D 1/041* (2013.01); *B28D 1/14* (2013.01); *B28D 5/021* (2013.01); *B28D 5/047* (2013.01); *C03B 33/037* (2013.01); *C03B 33/10* (2013.01); *C03C 17/00* (2013.01); *G05B 13/0205* (2013.01); *G05B 19/418* (2013.01); *G05B 2219/45009* (2013.01); *Y10T 409/303752* (2015.01); *Y10T 409/304312* (2015.01)

(58) Field of Classification Search
    CPC ........ B28D 5/02; B28D 5/047; C03B 33/037; C03B 33/10; G05B 13/0205; G05B 2219/45009; Y10T 409/303752; Y10T 409/304312
    USPC ......... 451/44, 54, 64, 910; 409/141; 408/17, 408/700
    See application file for complete search history.

(56) References Cited

U.S. PATENT DOCUMENTS

| | | | |
|---|---|---|---|
| 7,340,985 B2* | 3/2008 | Claesson | B23B 27/002 173/162.1 |
| 9,169,150 B2* | 10/2015 | Niewiera | C03B 33/0235 |
| 9,290,412 B2* | 3/2016 | Minami | B28D 1/14 |
| 2004/0155558 A1* | 8/2004 | Cuttino | H01L 41/0906 310/317 |
| 2010/0288101 A1* | 11/2010 | Iwamoto | C03B 33/03 83/883 |
| 2013/0309034 A1* | 11/2013 | Inagaki | B23Q 17/0976 409/132 |
| 2014/0093322 A1* | 4/2014 | Bleicher | B30B 15/304 409/131 |

FOREIGN PATENT DOCUMENTS

| | | |
|---|---|---|
| JP | 2004-83378 A | 3/2004 |
| JP | 2006-18922 A | 1/2006 |
| JP | 2008-7384 A | 1/2008 |
| JP | 2009-184878 A | 8/2009 |
| JP | 2009-256125 A | 11/2009 |
| JP | 2012-31018 A | 2/2012 |

* cited by examiner

| vibration number of processing unit (KHz) | 40 | 42 | 44 | 46 | 48 | 50 | 52 | 54 | 56 | 58 | 59 | 60 |
|---|---|---|---|---|---|---|---|---|---|---|---|---|
| state of processing | × | × | × | × | × | △ | △ | △ | △ | △ | △ | ○ |

| vibration number of processing unit (KHz) | 61 | 62 | 63 | 64 | 65 | 66 | 67 | 68 | 69 | 70 | 72 | 74 |
|---|---|---|---|---|---|---|---|---|---|---|---|---|
| state of processing | ○ | ○ | ○ | ○ | △ | △ | △ | △ | × | × | × | × |

× . tempered glasses were broken
△ . Chipping 100 to 150 μm (prcessing may be possible, but quality was worse)
○ . Chipping 30 μm or less (both of prcessing and quality are good)

Fig. 5

| vibration amplitude of processing unit ($\mu$m) | 1 | 2 | 3 | 6 | 7 | 8 | 9 | 10 | 11 | 12 |
|---|---|---|---|---|---|---|---|---|---|---|
| state of processing | × | × | ○ | ○ | ○ | ○ | ○ | △ | × | × |

× . tempered glasses were broken
△ . Chipping 100 to 150 $\mu$m (prcessing may be possible, but quality was worse)
○ . Chipping 30 $\mu$m or less (both of prcessing and quality are good)

Fig. 6

| response speed (m sec) | 10 | 5 | 1 | 0.5 | 0.4 | 0.3 | 0.2 |
|---|---|---|---|---|---|---|---|
| state of processing | × | × | × | △ | △ | ○ | ○ |

× . tempered glasses were broken
△ . Chipping 100 to 150 $\mu$m (prcessing may be possible, but quality was worse)
○ . Chipping 30 $\mu$m or less (both of prcessing and quality are good)

Fig. 14
magnified photograph of part A (270 times)
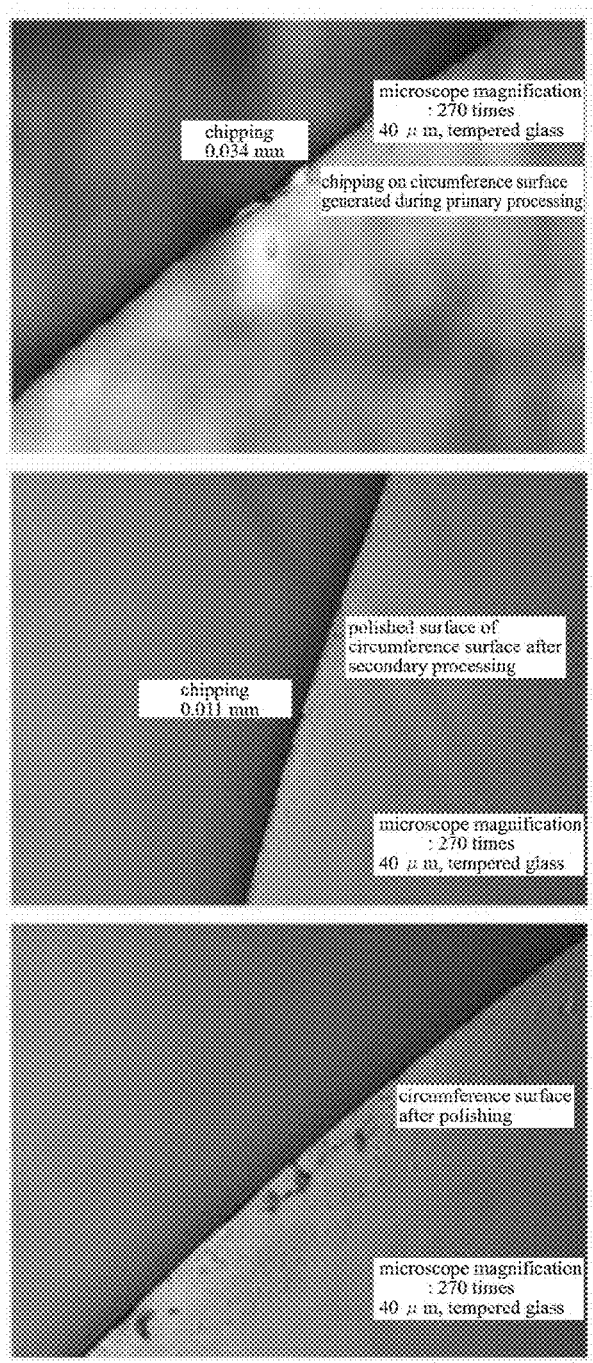
primary processing
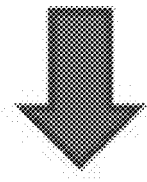
secondary processing
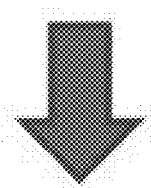
polish processing magnified photograph of part B (270 times)

Fig. 19
magnified photograph of part A (270 times)
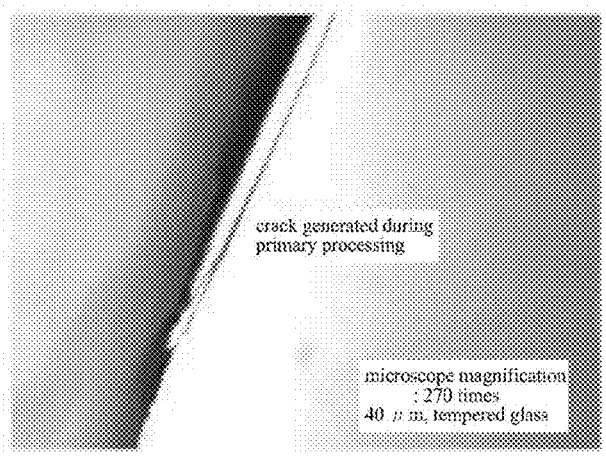
primary processing
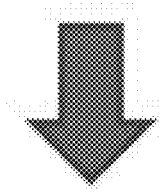
secondary processing
(no processing due to
crack generation)
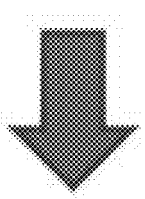
polish processing
(no processing due to
crack generation)

METHOD OF PROCESSING TEMPERED GLASS

TECHNICAL FIELD

The present invention relates to a method of processing a tempered glass.

BACKGROUND ART

A display device such as a mobile terminal, a tablet, a touch panel and PDA (Personal Digital Assistant) generally employs a tempered glass which is chemically reinforced. The tempered glass is configured by a glass base material and a surface reinforced layer (chemically reinforced layer) on its top surface. This configuration enables the tempered glass to have the thinner thickness while realizing the higher strength against bending stress and impact.

The processing of the tempered glass having the surface reinforced layer of a certain thickness or more and a certain surface compression stress or more (for example, the thickness of the surface reinforced layer is 40 µm or more, and the surface compression stress is 600 MPa or more) is not easy. Accordingly, a method of processing the tempered glass of Patent Publication 1 describes the tempered glass having the surface reinforced layer of 30 µm or less and the surface compression stress of 600 MPa or less which is processed by employing a known cutting method (such as laser beam machining). Further, Patent Publication 2 proposes a method of processing a tempered glass (the thickness of the surface reinforced layer is 40 µm or more, and the surface compression stress is 600 MPa or more) having a surface reinforced layer a part of which is removed for weakening the processing strength at an expected cutting position. Then, in this method, an expected cutting trench is formed and cut by using a laser.

However, in Patent Publication 1, only the workability of the tempered glass is attached importance and a further thinning and a further strengthening which are currently required are not satisfied by employing the method of Patent publication 1.

The formation of the expected cutting trench on the surface reinforced layer is essential in Patent publication 2 to increase the number of the steps, and further the processing on the tempered glass is restrictive because the expected cutting trench may be formed only in a linear fashion.

Under these circumstances, the present inventor firstly pays the attention to a processing method in which a processing device is vibrated and rotated and which has been recognized difficult to be applied to the processing of the tempered glass.

The product glass is specifically formed by cutting out a plurality of raw plates for final product in the shape of the product from a large substrate made of a tempered glass, and by processing the respective cut-out raw plates for final product including aperture formation processing.

PRIOR TECHNICAL PUBLICATIONS

Patent Publications

Patent Publication 1: JP-A-2004-83378
Patent Publication 2: JP-A-2012-31018

SUMMARY OF INVENTION

Problems to be Solved by Invention

When, as described above, the processing including the cut-out of the plurality of the raw plates for final product from the large substrate and the aperture formation processing to the cut-out raw plates is conducted to all of the raw plates by using the method in which the processing device is rotated and vibrated, a length of time required for production of one sheet of the product glass (average cycle time (time/piece)) is not necessarily short while the proper product can be obtained.

The preset invention has been made in consideration of the above matters. An object thereof is to provide a method of processing a tempered glass in which a length of time required for production of one sheet of the product glass is reduced as much as possible while the quality of the product glass is secured.

Means of Solving Problems

The present invention for achieving the above object includes the configuration of a method of processing a chemical tempered glass for processing a raw plate for a product of the chemical tempered glass having a surface reinforced layer by using a processing device which is rotated and vibrated, the method including, cutting out the raw plate for the product from a large substrate acting as the chemical tempered glass having the surface reinforced layer by using a dicing plate prior to the processing by the processing device to the raw plate for the product, and conducing a finish processing to an outer peripheral surface of the raw plate for the product, with the processing by the processing device to the raw plate for the product.

Effects of Invention

In accordance with the present invention, since the product glass is cut out from the large substrate by the cut processing by use of the dicing blade, the operation of the cutting out of the raw plates for final product can be performed more rapidly than a operation in which the raw plates for final product are cut-out from the large substrate by use of the processing device under rotation and vibration. On the other hand, even if the chipping is generated on the outer peripheral surface of the raw plates for final product by the cut processing, the mending of the outer peripheral surface of the raw plates is appropriately performed by conducting also the finish processing to the outer peripheral surface of the raw plates in addition to the processing including the aperture formation processing by the processing device under rotation and vibration. Especially, the finish processing is intrinsically conducted to the processed surfaces including the outer peripheral surface of the raw plates and is not a special processing. Accordingly, the length of time required for production of one sheet of the product glass is reduced as much as possible while the quality of the product glass is secured.

In accordance with another feature of the invention, since the large substrate is cut by using the dicing blade at a region above the spaces between the adjacent individual bases of the base table for cut processing in which the plurality of the individual bases are aligned keeping spaces between then on the base plate for the cut processing, the simple cut processing can be repeated based on information on the dimension of the individual bases known in advance and the pitch between the individual bases on the base plate for the cut processing during the cut-out of the plurality of the raw plates from the large substrate mounted on the top surface of the plurality of the individual bases. Accordingly, the control of the cut processing can be simplified as well as the raw plates are cut-out precisely.

Since the respective individual bases to which the raw plate is mounted is held on the base plate for the processing, and then the processing is performed to the raw plate on the respective individual bases on the base plate for the processing, for forming the product glasses on the respective individual bases, the information on the dimension of the individual bases and the pitch between the individual bases on the base plate can be known in advance also in this case so that the processing by the processing device can be performed by the repeating of the simple cut processing. Accordingly, the control of the cut processing can be simplified as well as the raw plates are cut-out precisely to the product glasses even without an expensive camera system having high performance.

In accordance with another feature of the invention, the arrangement position of the plurality of the position-determining parts with respect to the frame-shaped patterns group printed on the large substrate superposed on and matched with the plurality of the individual bases in the situation that the plurality of the individual bases are held on the table for the cut processing is reflected on the arrangement position of the position-determination involved elements with respect to the frame-shaped patterns group of the large substrate 1 position-determined on the adjusting base table. After the large substrate is placed on the adjusting base table, the plurality of the respective position-determining marks of the large substrate are position-determined with respect to the plurality of the respective position-determining parts. Under this situation, while the plurality of position-determination relating elements and the plurality of the position-determination involved elements are maintained in their position-determined situation, the transfer element is mounted on the adjusting base table, and it is conveyed to the base table for the cut processing. When the large substrate on which the transfer element is mounted is mounted on the plurality of the individual bases held on the base table for the cut processing while the plurality of the respective position-determination relating elements of the transfer element and the plurality of the respective position-determining parts on the base plate for the cut processing are maintained in their position-determined situation, the frame-shaped patterns group of the large substrate can be superposed on and matched with the plurality of the individual bases held on the base table for the cut processing without any slant. Accordingly, the raw plates for product can be cut out from the large substrate, and the product failure can be prevented.

When the frame-shaped patterns group of the large substrate is superposed on and matched with the plurality of the individual bases held on the base table for cut processing without any slant, the large substrate may be used which includes the frame-shaped patterns group superposed on and matched with the plurality of the individual bases on the base table for cut processing and the position-adjusting marks having the specified positional relation with respect to the frame-shaped patterns group, and the base table for the cut processing may include the plurality of the position-determining parts having the specified positional relation with respect to the frame-shaped patterns group of the large substrate superposed on and matched with the plurality of the individual bases. The adjusting base table may include the surface of placing the large substrate thereon, the plurality of the position-adjusting parts for position-adjusting the plurality of the position-adjusting marks to the plurality of the large substrate placed on the above surface of placing, and the position-determination involved elements in which the positional relation with respect to the frame-shaped patterns group of the large substrate under the situation that the plurality of the respective position-determining marks are position-determined with the plurality of the position-determining parts is the same as the positional relation of the plurality of the position-determining parts with respect to the frame-shaped patterns group of the large substrate superposed on and matched with the plurality of the individual bases on the base table for cut processing, and the transfer element may include the plurality of the position-determination relating elements which can establish the position-determining relation with respect to the plurality of the position-determining parts and the plurality of the position-determination involved elements. Accordingly, the method can be performed by using inexpensive elements. Further, the durable elements which are trouble-proof different from cameras and sensors can be used.

In accordance with another feature of the invention, since the adhesive agent is used for mounting the transfer element to the large substrate, the bonding operation of the transfer element to the large substrate and the position-determining operation between the plurality of the respective position-determination relating elements of the transfer element and the plurality of the position-determination involved elements of the adjusting base table can be simultaneously performed without each other's hindrance so that the workability can be elevated. While, on the other hand, a variety of the adhesive agents are present with regard to their bonding strength which may be properly adjusted and the transfer element and the large substrate can be bonded and integrated at a specified bonding strength by using the adhesive agent, the adhesive agent may be easily selected such that the bonding between the transfer element and the large substrate can be released by applying an external force of a worker.

In accordance with another feature of the invention, since, before the transfer element is bonded to the large substrate, the cover glass is bonded to the large substrate and the transfer element is bonded to the large substrate through the cover glass, even if dirt and damage are generated during the mounting and the dismounting of the transfer element, they are stopped by the cover glass so that no damages such as dirt are provided to the large substrate acting as the raw material of the final product glass.

In accordance with another feature of the invention, since the adhesive agent which is soluble in warm water is used for bonding the cover glass to the large substrate, the cover glass can be exfoliated from the product glass by using the warm water after the completion of the processing without exerting an external force.

In accordance with another feature of the invention, the stack prepared by bonding the frame-shaped patterns group of the large substrate is used, as the large substrate, after the plurality of the large substrates are stacked, and the plurality of the position-determining marks of the respective large substrates of the stack and the plurality of the position-determining parts of the adjusting base table are position-determined for forming the stack. Accordingly, by utilizing the plurality of the position-determining marks of the respective large substrates and the plurality of the position-determining parts of the adjusting base table, the stack can be appropriately obtained in which the frame-shaped patterns group of the large substrate is matched with each other.

In accordance with another feature of the invention, since the position-determining parts of the adjusting base table are configured by a pair of detection cameras disposed on the axis line vertically extending, even if the transparency of the cover glass and the large substrate is reduced due to the adhesive agent existing therebetween, the position-determining marks of the respective large substrates can be sequentially and appropriately detected and position-determined by using the bottom side and top side cameras on the same axis line.

Unless the adhesive agent is radiated with specified radiation rays, the agent is not cured so that the position-determination between the position-determining marks of the respective large substrates can be easily achieved by adjusting the timing of the curing of the adhesive agent.

In accordance with another feature of the invention, while the vibration by the processing device to the raw plates for the product as the tempered glass is feed-back-controlled such that the amplitude and the frequency of the processing device approach to the target amplitude and the target frequency of the processing device, respectively, the values of the target amplitude and the target frequency are set to change at the respective positions in the direction of the thickness of the raw plate for product accompanied with the processing of the raw plate for product, which do not belong to the range of generating the quality degradation, and the feedback control is carried out at every sample frequency of 0.3 msec or less. Accordingly, even if the raw plate for the product is the tempered glass having the surface reinforced layer with the high strength (specifically, the thickness of the surface reinforced layer is 40 μm or more, and the surface compression stress is 600 MPa or more), it is freely processed without the restriction of the processing pathway. On the other hand, the amplitude and the frequency of the processing device are set not to belong to the range of generating the quality degradation.

Further, since the specified sample cycle of 0.3 msec or less is used as the sample cycle of the feed-back control, the re-examining can be intended at the significantly prompt timing, and even if the values of the amplitude and the frequency of the processing device are in the range of generating the quality degradation, the amplitude and the frequency of the processing device can be returned to the target amplitude and the target frequency (out of the range of generating the quality degradation), respectively, of the processing device at the significantly prompt timing. Accordingly, even if the slight condition change of the processing occurs such as release of a tensile stress inside of the raw plate for product during the processing, such a change can be responded (followed), and the generation of cracks of the raw plate for product and chipping over a specified value can be properly suppressed. As a result, the processing of the raw plate for product can be performed simply and reliably.

Accordingly, the processing can be performed simply and reliably while securing the processing freedom even if the raw plate for product is a chemical tempered glass of which a strength is elevated by proving the surface reinforced layer.

The reasons why the sample cycle in the feed-back control is set on or below 0.3 msec is that the possibility of reducing the processing accuracy of the raw plate for product (generation of the cracks and the chipping of the raw plate for product) over the specified degree increases because the glass cannot follow the stress change in the raw plate for product over 0.3 msec, based on the knowledge the present inventor has obtained.

BRIEF DESCRIPTION OF DRAWINGS

FIG. 5 A table showing the experiment results (the experiment results of Processing Experiment 2) wherein the target vibration amplitudes of the processing device were changed while the conditions were fixed such that the target vibration frequency of the processing device was 63 kHz and the sample cycle (response speed) of the feedback was 0.2 msec.

FIG. 6. A table showing the experiment results (the experiment results of Processing Experiment 3) wherein the sample cycles (response speeds) of the feedback were changed while the conditions were fixed such that the target vibration amplitude of the processing device was 8 μm and the target vibration frequency of the processing device was 63 kHz.

FIG. 14 Magnified photographs showing the part A of FIG. 13 (magnification: 270 times).

FIG. 19 A magnified photograph showing the part of the protection glass for the portable terminal of Comparative Example which corresponds to the part A of FIG. 13 (magnification: 270 times).

EMBODIMENTS FOR IMPLEMENTING INVENTION

Embodiments of the present invention will be hereinafter described referring to the annexed drawings.

In the description of the present embodiment, the tempered glass which is the subject of the of processing, the apparatus of the ultrasonic vibration processing acting as the apparatus for processing the tempered glass, the method of processing the tempered glass employing the above apparatus of the ultrasonic vibration processing, the comparison between processes qualities will be described in this turn.

1. Tempered Glass

Figure 1:
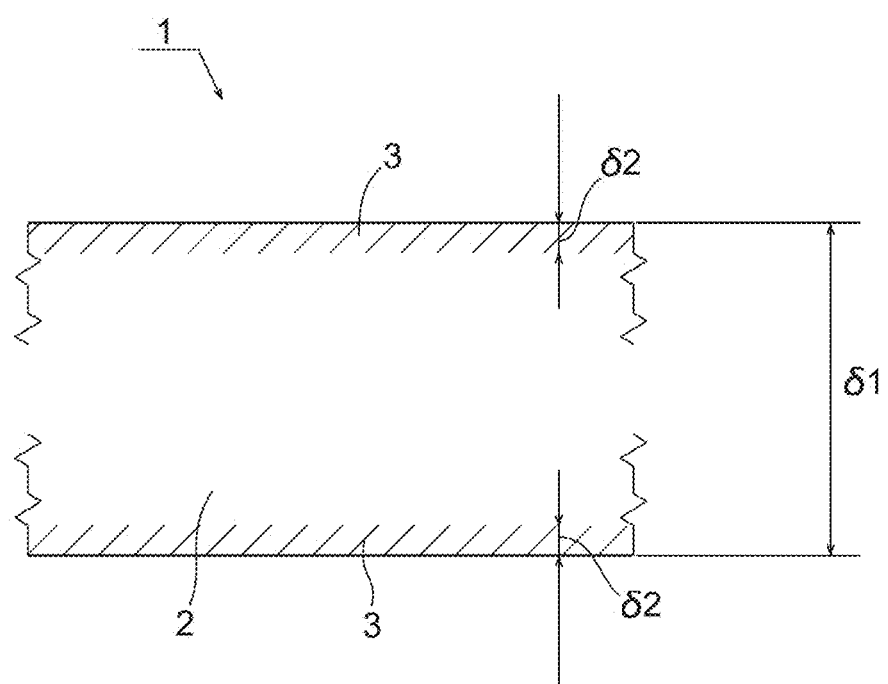
FIG. 1 An explanatory view showing a tempered glass having a surface reinforced layer FIG. 2 An entire configuration of a processing apparatus under ultrasonic vibration in accordance with an embodiment.

As shown in FIG. 1, the tempered glass 1 has the configuration including a glass mother material 2 (for example, alumino-silicate glass) and a surface reinforced layer (chemically reinforced layer) 3 placed on its top surface side (bottom surface side). The surface reinforced layer 3 enables the thinning of the tempered glass 1 and secures the high strength against the impact. The specific tempered glass 1 to be processed has the thickness ($\delta$ 1) of the mother material 2 of about 0.7 mm, the thickness ($\delta$ 2) of the surface reinforced layer of 3 of 40 μm or more (the surface reinforced layer having the thickness of 70 μm is currently developed which is, of course, a subject of the processing), and a surface compression stress from 600 MPa to 700 MPa. Of course, the ordinary glass in addition to the tempered glass is a subject of the processing by the ultrasonic vibration processing apparatus.

2. Ultrasonic Vibration Processing Apparatus (1) As shown in FIG. 2, the ultrasonic vibration processing apparatus 4 includes a processing apparatus main body 5.

Figure 2:
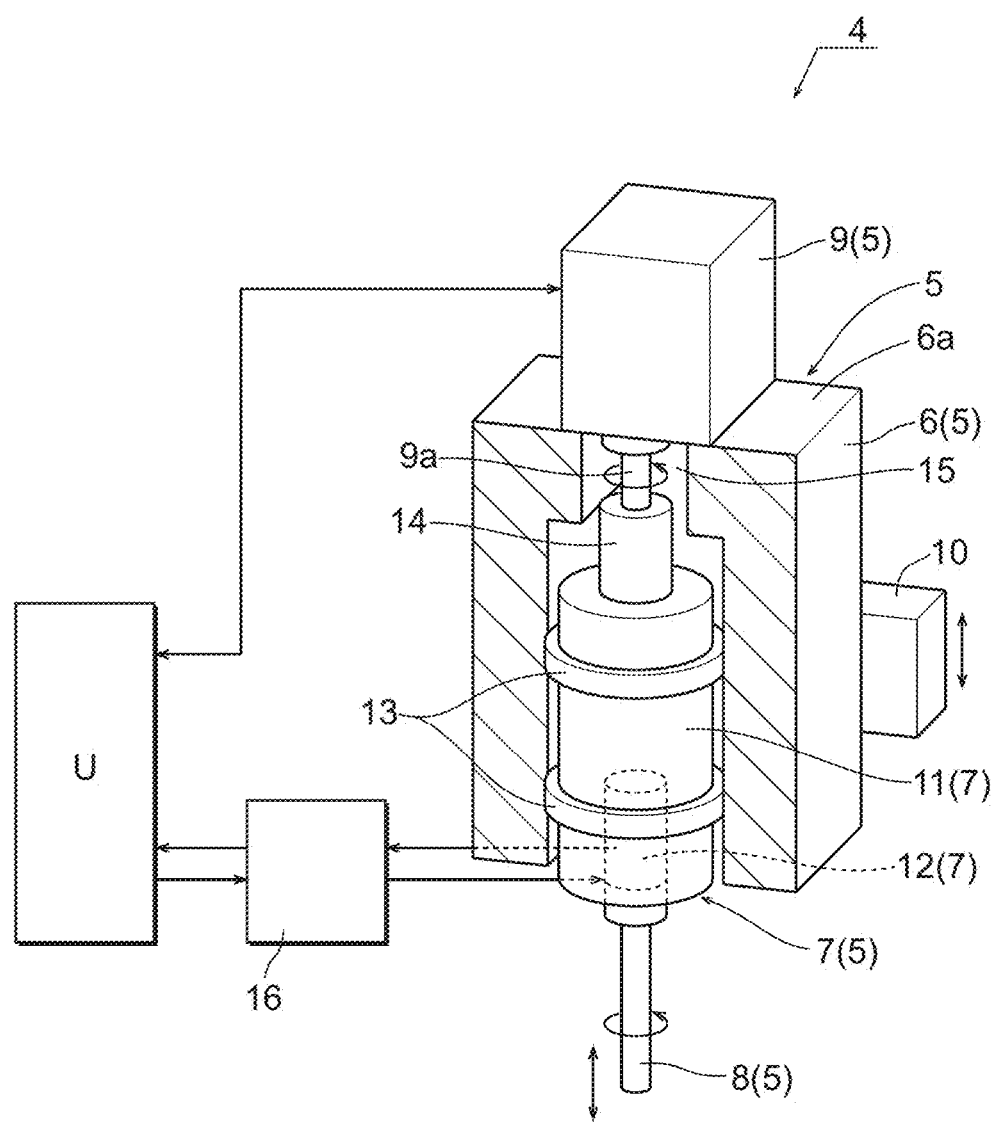

As shown in FIG. 2, the processing apparatus main body 5 includes a relatively long and cylindrical housing 6 with a closed end, a vibration apparatus (vibration mechanism) 7 mounted in the housing 6, a processing device 8 attached to the vibration apparatus 7, and a motor 9 for rotating and driving the vibration apparatus 7.

(a) The housing is mounted to an elevating apparatus (only part of which (an attaching part to the housing) is shown in FIG. 2) 10. The elevating apparatus 10 has functions of not only raising and lowering the housing 6 along the vertical direction (refer to an arrow) but also adjusting the elevating speed. The housing is lowered at a specified setting speed (feed speed) during the processing.

(b) The vibration apparatus 7 includes a columnar body 11, and a columnar unit 12 for generating ultrasonic vibrations. The body 11 is positioned, with its axial center oriented in the vertical direction, on the inner circumferential surface of the housing via bearings 13. The bearings 13 enable the body 11 to rotate around its axial center and disable the body 11 to move in the direction the axial center extends (vertical direction). A circular cylinder 14 for mounting a driving axis 9a of the motor 9 is formed at the top end of the body 11, and a holding aperture (not shown) is formed at the bottom end surface of the body 11. The unit 12 for generating ultrasonic vibrations is fixed to the holding aperture at the bottom surface of the body. As known in the art, the unit 12 is configured with an ultrasonic vibrator, a vibration transmitting section and an amplification section connected in series, and these ultrasonic vibrator, vibration transmitting section and amplification section are disposed in this turn from the inside of the holding aperture of the body 11 toward the open side. The ultrasonic vibrator among these has piezoelectric elements and metal blocks for fastening these with bolts, and electrodes are positioned between the piezoelectric elements and between the piezoelectric element and the metal block. The application of a direct pulse voltage between the electrodes excites the piezoelectric elements to generate the vertical vibrations. The ultrasonic vibrator generates the strong ultrasonic vibrations by means of a resonance phenomenon when the frequency of the direct pulse voltage to be applied is set to be equal to the resonance frequency of the ultrasonic vibrator. The vibration transmitting section has a function of transmitting the vibrations of the ultrasonic vibrator to the amplification section, and the amplification section has a function of amplifying the vibrations transmitted from the vibration transmitting section.

(c) As shown in FIG. 2, the processing device 8 is connected to the amplification section of the unit 12 at the axial center thereof in order to be vibrated by the vibrations of the unit 12. The processing unit 8 processes the tempered glass under the direct contact therewith and is made of a diamond grindstone in the form of axis, and extends downward from the unit 12. The processing device 8 has functions of not only processing the tempered glass and of but also acting as a sensor for detecting the pressure change of the tempered glass.

(d) The motor 9 is mounted to an outer surface (top end surface) of the bottom part 6a of the housing 6. A penetration aperture 15 is formed through the bottom part 6a of the housing 6, which communicates the outside and the inside of the housing, and the driving axis 9a of the motor 9 penetrates the penetration aperture 15 and is engaged and held (fixed) to the circular cylinder 14 of the body 11. Thereby, the driving force of the motor 9 is transmitted through the body 11 and the unit 12 to the processing unit 8 where the processing unit 8 can rotate around the axial center.

Figures 3, 4:
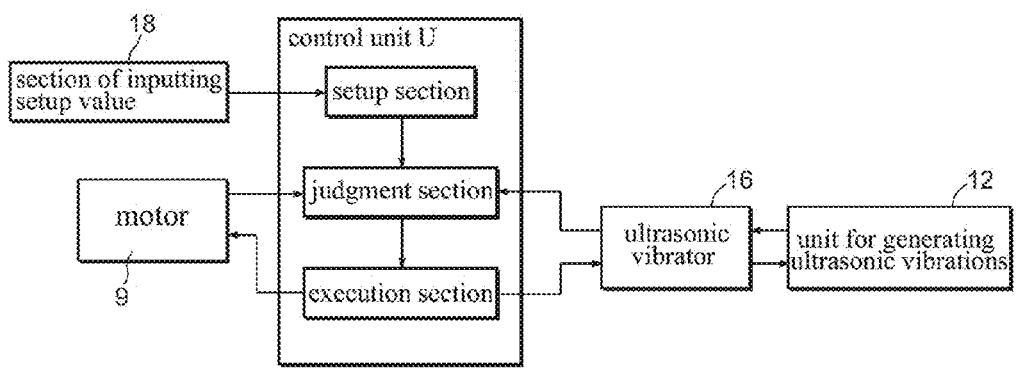
FIG. 3 A block diagram showing a control in the processing apparatus under ultrasonic vibration in accordance with the embodiment.
FIG. 4 Tables showing the experiment results (the experiment results of Processing Experiment 1) wherein the target vibration frequencies of the processing device were changed while the conditions were fixed such that the target vibration amplitude of the processing device was 8 μm and the sample cycle (response speed) of the feedback was 0.2 msec.

(2) As shown in FIG. 2 and FIG. 3, the ultrasonic vibration processing apparatus 4 includes an ultrasonic oscillator (vibration adjusting means) 16 adjusting the vibration amplitude and the vibration frequency of the unit 12.

The ultrasonic oscillator 16 adjusts an input electric signal (specifically, voltage or current), and the adjusted electric signal is then supplied to the unit 12 (ultrasonic vibrator). In this Embodiment, the amplitude and the frequency of an input voltage from a power source are adjusted while the value of current is not changed (for example, a specified value from 1 to 2 A), and the adjusted voltage signal (for example, 300 to 400 V) is supplied to the unit 12 (ultrasonic vibrator). Of course, in this case, a current signal may be supplied to the ultrasonic vibrator under the constant voltage instead of the voltage signal.

(3) As shown in FIG. 2 and FIG. 3, the ultrasonic vibration processing apparatus 4 includes a control unit U which controls the ultrasonic oscillator 16 (unit 12 for generating ultrasonic vibrations).

(a) The voltage signal (amplitude and frequency signals of the voltage) from the ultrasonic oscillator 16, and the rotation number signal of the motor 9 (voltage) are input to the control unit U, and control signals for the ultrasonic oscillator 16 and the motor 9 are output from the control unit U.

(ii) The control unit U includes a setup section (setup means) which setups a target value for a feedback control, a judgment section (judgment means) which judges an operation variable based on the deviation between the target value of the setup section and the control variable, and an execution control section (execution control means) which outputs the control signal for performing the operation variable coming from the judgment section.

The target vibration amplitude and the target vibration frequency with respect to the input voltage to the unit 12 for generating ultrasonic vibrations (ultrasonic vibrator) as the target values for the feedback control are established in the setup section, and these values change along thickness of the tempered glass during the processing of the tempered glass, and do not belong to the range where the value of degrading the quality of the tempered glass is generated (values of generating cracks and the chippings in the tempered glass over the specified degree). This is because the stress change in the tempered glass during the processing such as release of a tensile stress inside of the tempered glass must be considered. The target current is setup with respect to the input current to the motor 9 in view of realizing the effective rotation for the processing.

The target vibration amplitude of the input voltage with respect to the unit 12 for generating ultrasonic vibrations is setup such that the vibration amplitude of the processing device 8 finally falls into a range (which does not fall into a range where a value of degrading the quality of the tempered glass is generated) of 3 µm to 9 µm (preferably 8 µm). The values under 3 µm and over 9 µm are recognized to fall in the range where the value of degrading the quality of the tempered glass is generated. The reasons why the target vibration amplitude is, based on the knowledge the present inventor has obtained, set in the range from 3 µm to 9 µm is that the cracks and the chippings over a specified degree are generated due to the insufficient processing ability (due to the increase of the cutting resistance occurring by the remaining of the cutting scrap) under 3 µm and that the possibility of generating the cracks and the chippings over a specified degree in the tempered glass is increased because the tempered glass cannot follow the stress change generated therein during the processing over 9 µm.

The target vibration frequency of the input voltage with respect to the unit 12 for generating ultrasonic vibrations (ultrasonic vibrator) is setup such that the vibration frequency of the processing device 8 finally falls into a range (which does not fall into a range where the value of degrading the quality of the tempered glass is generated) of 60 kHz to 64 kHz (preferably 63 kHz). The values under 60 kHz and over 64 kHz are recognized to fall in the range where the value of degrading the quality of the tempered glass is generated. The reasons why the target vibration frequency is, based on the knowledge the present inventor has obtained, set in the range from 60 kHz to 64 kHz is that the cracks and the chippings over specified degrees are generated due to the insufficient processing ability under 60 kHz and that the possibility of generating the cracks and the chippings over specified degrees in the tempered glass is increased because the tempered glass cannot follow the stress change generated therein during the processing over 64 kHz.

The target current with respect to the motor 9 is established such that the rotation number of the processing device 8 falls in a specified rotation number from 2000 rpm to 30000 rpm (preferably 5000 rpm). The reasons why the rotation number of the processing device is set in the range from 2000 rpm to 30000 rpm are that the processing effect to the tempered glass is insufficient under 2000 rpm and that the processing effect is reduced by the occurrence of a slip phenomenon (reduction of processing resistance) on the processed surface over 30000 rpm, thereby generating the problem of durability.

In FIG. 3, a numeral 18 denotes a section of inputting a setup value into the setup section.

The judgment section judges, with respect of the vibration amplitude of the processing unit 8, the operation variable based on the deviation between the amplitude of the voltage (return voltage) from the ultrasonic oscillator 16 and the target amplitude of the setup section, and judges, with respect of the vibration number of the processing device 8, the operation variable based on the deviation between the frequency of the voltage (return voltage) from the ultrasonic oscillator 16 and the target frequency of the setup section. With respect to the rotation number of the processing device 8, the operation variable is judged based on the deviation between the current signal from the motor 9 and the target current of the setup section.

(c) The execution control section outputs, as the control signals, the respective operation variables from the judgment section to the ultrasonic oscillator 16 and the motor 9. Thereby, the output voltage (amplitude, frequency) from the ultrasonic oscillator 16 is adjusted so that the processing device 8 is controlled in the feedback fashion to take a specified vertical amplitude and a specified frequency. Also, the rotation number of the motor 9 is controlled in the feedback fashion to keep the rotation number of the processing device at a specified rotation number.

(iii) The control unit U is set to perform the feedback control at the sample cycle (response speed) range of 0.3 msec or less or from 0.3 msec to 0.2 msec (preferably 0.2 msec). The reasons why the sample cycle is set in the range from 0.3 msec to 0.2 msec is that the possibility of generating the cracks and the chipping in the tempered glass over the specified degree increases because the glass cannot follow the slight stress change therein over 0.3 msec, based on the knowledge the present inventor has obtained. The lower limit of 0.2 msec is the lowermost limit currently available, and the feedback control cannot be conducted below the lower limit sample cycle. If a tempered glass having a sample cycle below 0.3 msec will be developed, the use thereof is more preferable.

The speed-up of the analogue/digital conversion function and the arithmetic processing ability of CPU in the control unit U is intended compared to an existing control unit for the speed-up of the sample cycle of the feedback control. Thereby, when the sample cycle is set to be 0.2 msec and the vibration number (frequency) of the processing device 8 is set to be 80 kHz, the number of the vibration impact supplied to the tempered glass before the vibration starts responding to the load change under the optimum conditions can be suppressed to 16 times. When the vibration conditions are made optimum at the sample cycle of 0.2 msec under the feed speed of the processing device 8 of 30 mm/min., the processing proceeds with the feedback control taking place every 0.1 µm so that the slight condition change (stress change) during the processing can be responded (followed).

On the other hand, when the vibration number (frequency) of the processing device 8 is 80 kHz, the vibration impact is supplied to the tempered glass once in every 0.0000125 second (0.0125 ms). When the sample cycle (vibration response speed) is 10 msec under the same vibration number (under the case of existing control unit), 800 times of the vibration impacts are supplied to the tempered glass before the vibration starts responding to the load change under the optimum conditions. When the vibration conditions are optimized at the sample cycle of 10 msec under the feed speed of the processing device 8 of 30 mm/min, the processing proceeds every 5 µm. This 5 µm is relatively larger with respect to the surface reinforced layer of several tens µm, and the condition changes of the tempered glass cannot be followed. As its result, the processing must be performed while the stress is given to the tempered glass, and the cracks are generated on the tempered glass.

(iv) Target Values of Control

The target values of the above control will be backed up in the Processing Experiments 1 to 3 below which were conducted by the present inventor. The Processing Experiments 1 to 3 were conducted to the tempered glass under the following common experiment conditions, and their evaluations were performed based on the following evaluation standards.

(a) Common Experiment Conditions
Tempered Glass to be Processed
  Material of mother material: alumino-silicate glass
  Thickness of mother material (δ 1): 0.70 mm
  Thickness of surface reinforced layer (δ 2): 40 µm (0.04 mm)
  Compressive residual stress: 600 MPa to 700 MPa
Processing Device 8
  Feed speed for processing: 60 mm/min.
  Number of rotations: 5000 rpm
  Diameter of axial processing device: 1.5 mm
  Grain size of processing device 8: #600

(b) Common Evaluation Standard
  X: Tempered glass was broken.
  Δ: Chipping 100 to 150 µm (processing might be possible, but quality was worse)
  ◯: Chipping 30 µm or less (both of processing and quality were good)

(c) Processing Experiment 1

(c-1) An experiment was conducted in which a target number of vibration (target frequency) was changed under the fixed conditions below by adjusting voltages for obtaining excellent number of vibrations of a processing device 8 with respect to one piece of tempered glass.
  Target vibration amplitude of processing device: 8 µm
  Sample cycle (response speed) of feedback: 0.2 msec (c-2) The results shown in FIG. 4 were obtained by Processing Experiment 1. In accordance with the results of FIG. 4, it was found out that the target number of vibration of the processing device 8 was preferably from 60 kHz to 64 kHz (especially 64 kHz) (the range where the value of degrading the quality is under 60 kHz and over 64 kHz).

(d) Processing Experiment 2

(d-1) An experiment was conducted in which a target vibration amplitude of a processing device 8 was changed under the fixed conditions below by adjusting voltages for obtaining excellent target vibration number of the processing device 8 with respect to one piece of tempered glass.
  Target frequency of processing device: 63 kHz
  Sample cycle (response speed) of feedback: 0.2 msec (d-2) The results shown in FIG. 5 were obtained by Processing Experiment 2. In accordance with the results of FIG. 5, it was found out that vibration amplitude of the processing device 8 was preferably from 3 µm to 9 µm (especially 8 µm) (the range where the value of degrading the quality is under 3 µm and over 9 µm).

(e) Processing Experiment 3

Figure 7:
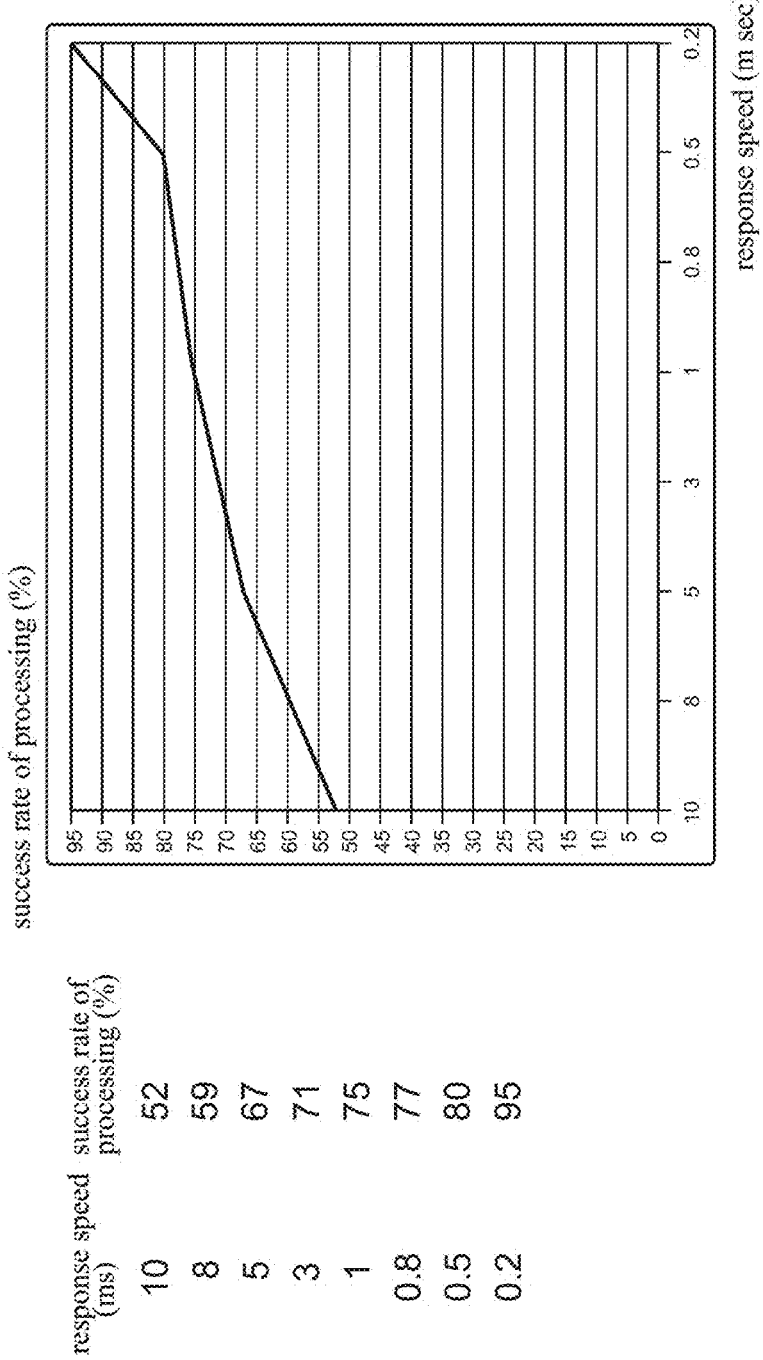
FIG. 7 A graph showing the relation between the sample cycle (response speed) of the feedback and the success rate of the processing.

(e-1) An experiment was conducted in which a sample cycle (response speed) of feedback was changed under the fixed conditions below because the sample cycle of the feedback of the processing was important for the tempered glass in which a slight condition change occurred during the processing.
  Target vibration amplitude of processing device: 8 µm
  Target vibration frequency of processing device: 63 kHz (e-2) The results shown in FIG. 6 were obtained by Processing Experiment 3. In accordance with the results of FIG. 6, it was found out that the sample cycle of the feedback was preferably under 0.3 msec (especially 0.2 msec). The lower limit (0.2 nsec) is a limit value currently available (e-3) FIG. 7 shows the relation between the sample cycles (response speeds) of feedback control and the success rates of the processing. In accordance with FIG. 7, it was found out that the success rate increased with the decrease of the response speed, and the success rate increased with the significant rise especially below 0.5 msec. The evaluation of processing success was the same as the above-mentioned (◯). In FIG. 6, the results with the success rate of 87% or more are evaluated as "◯".

3. Then, an example of the method of processing the tempered glass in accordance with Embodiment will be described together with the control of the above control unit U.

Figure 8:
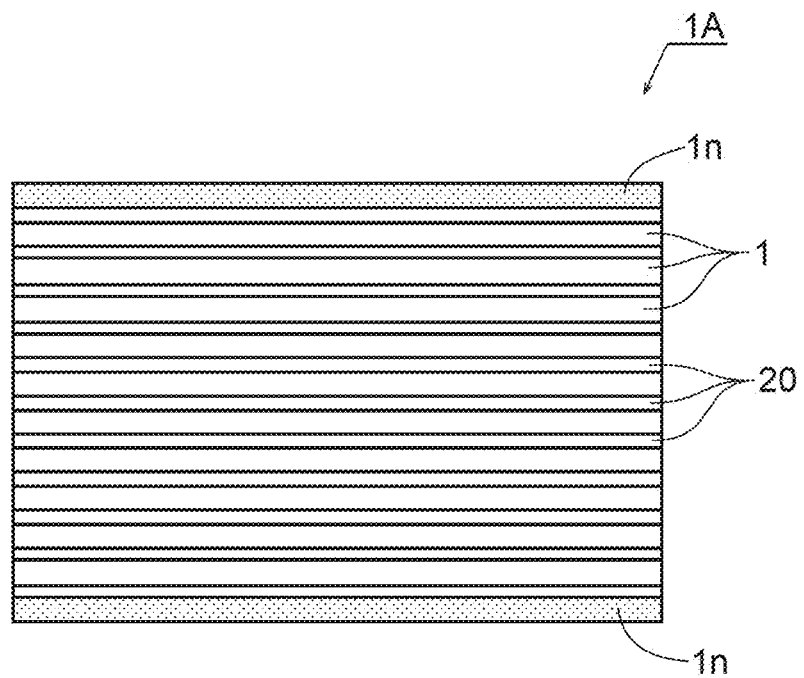
FIG. 8 An explanatory view showing a stack of tempered glasses to be processed.

(1) At first, as shown in FIG. 8, the tempered glass 1 (thickness of mother material was 0.7 mm, thickness of surface reinforced layer was 40 µm or more, and surface compression stress was 600 MPa or more) having the surface reinforced layer 3 in the shape of a larger plate is provided. The larger plated-tempered glass is cut out for preparing a plurality of pieces having a certain shape which is used for protection glass of portable terminals and tablets. In the present Embodiment, a stack (a group of stacked glasses) 1A which is prepared by joining a plurality (for example, 12 sheets) of larger plates (tempered glass 1) stacked together by using an adhesive 20 (adhesive layer is 80 µm to 100 µm) is provided for elevating the production efficiency. The adhesive 20 preferably includes a UV cure adhesive which is cured with ultraviolet rays and soluble in warm water because the adhesive is required to be rapidly cured and thereafter to be peeled off from the cut-out respective pieces of the tempered glass. The glass 1n forming the outermost surface (top surface, bottom surface) of the stack 1A may be inexpensive ordinary glass instead of the tempered glass because chipping likely occurs in the outermost surface of the stack 1A. Another stack 1A prepared by joining 16 sheets of larger plates (tempered glass 1) of which a mother material thickness is 0.5 mm may be also employed.

Figure 9:
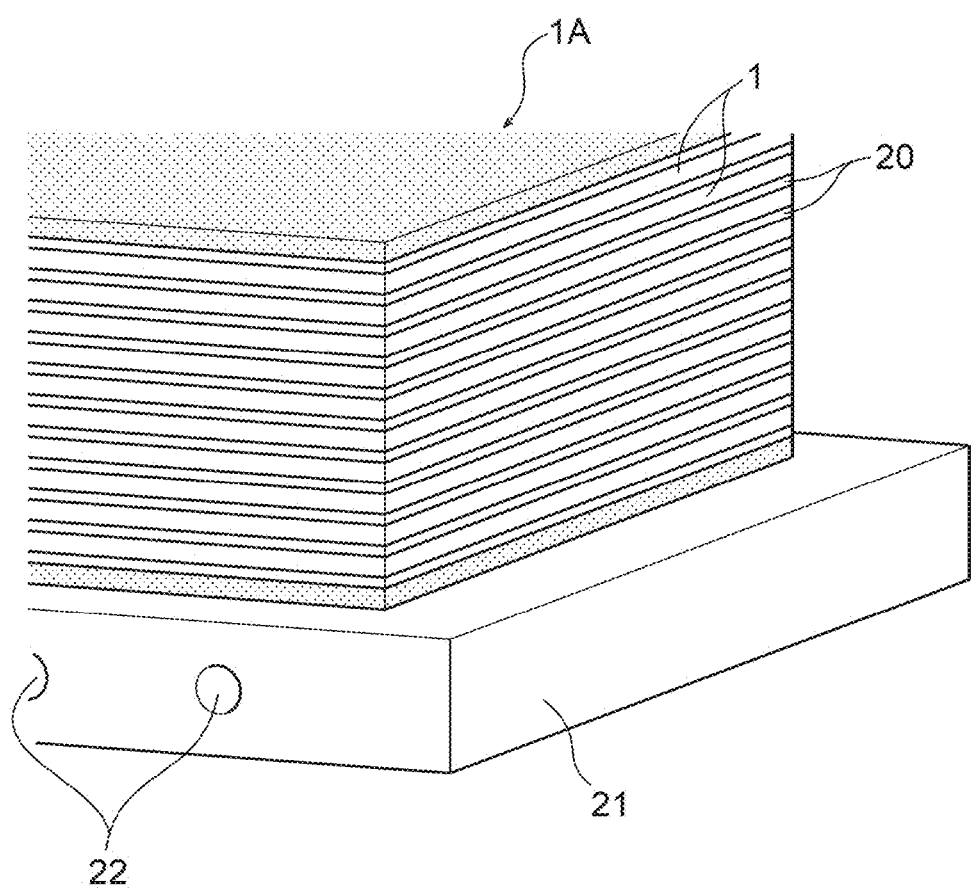
FIG. 9 An explanatory view showing a situation in which the stack of the tempered glasses is placed on a holding board.

(2) As shown in FIG. 9, the above stack 1A is then placed on a thick fixing base 21. A plurality of trenches (not shown) are formed on a top surface of the fixing base 21, and a plurality of communication apertures 22 which are communicated to the respective trenches through the inside of the fixing base 21 are open to a side surface of the fixing base 21. A suction device (not shown) is connected to the respective communication apertures 22, and air above the fixing base 21 is sucked through the trenches on the top surface of the fixed base 21 and the communication apertures 22. Thereby, the stack 1A placed on the fixing base 21 is fixed on the fixing base 21 by means of the sucking action.

Figure 10:
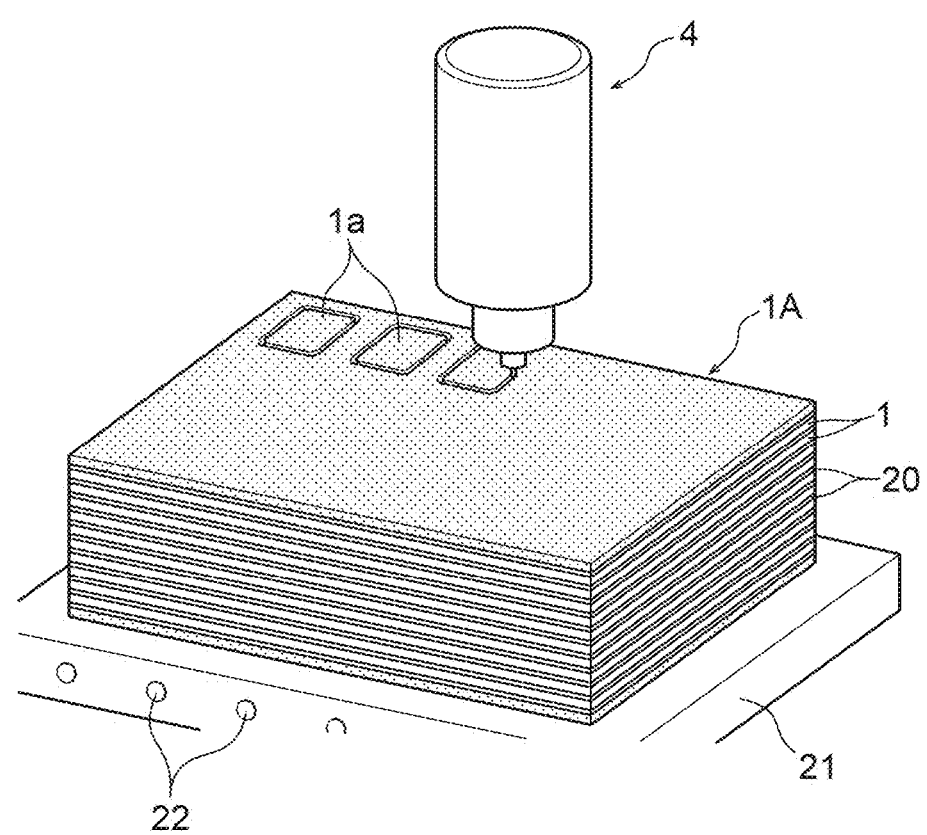
FIG. 10 An explanatory view showing a cut-out processing on the stack of the tempered glasses.
Figure 11:
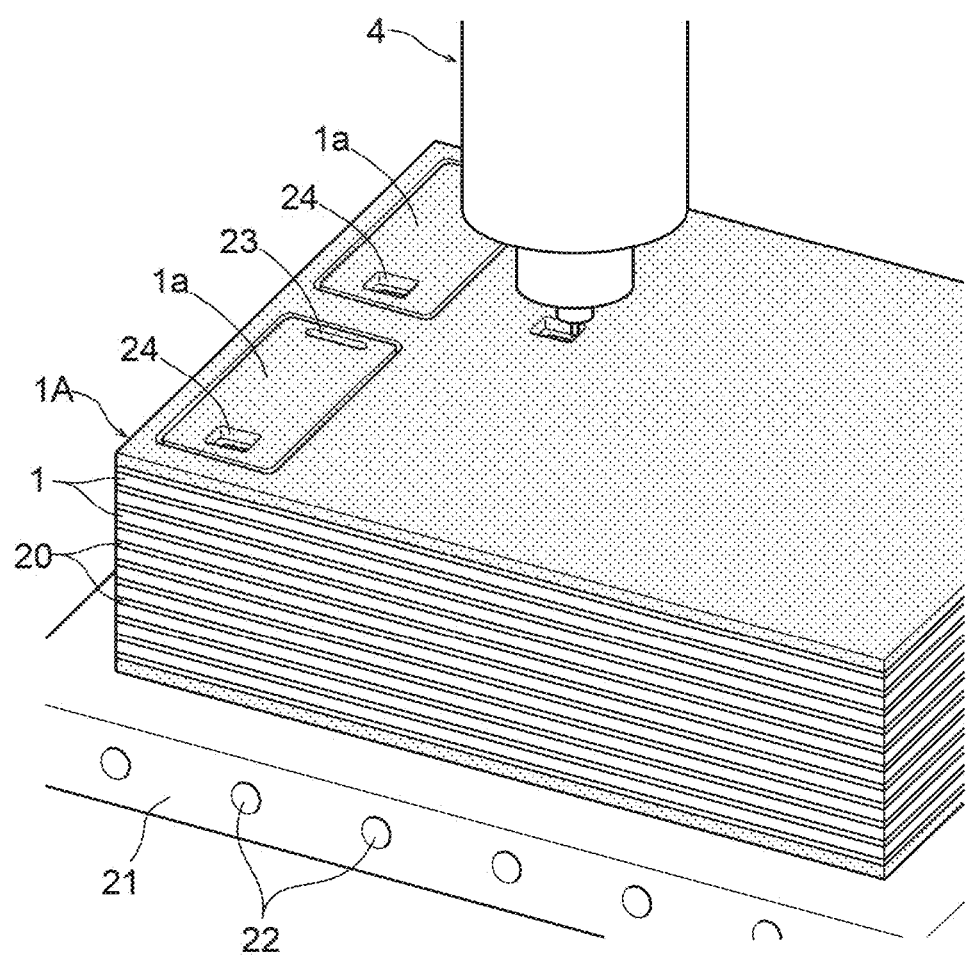
FIG. 11 An explanatory view showing formation of long holes and square holes through a stacked block.
Figure 12:
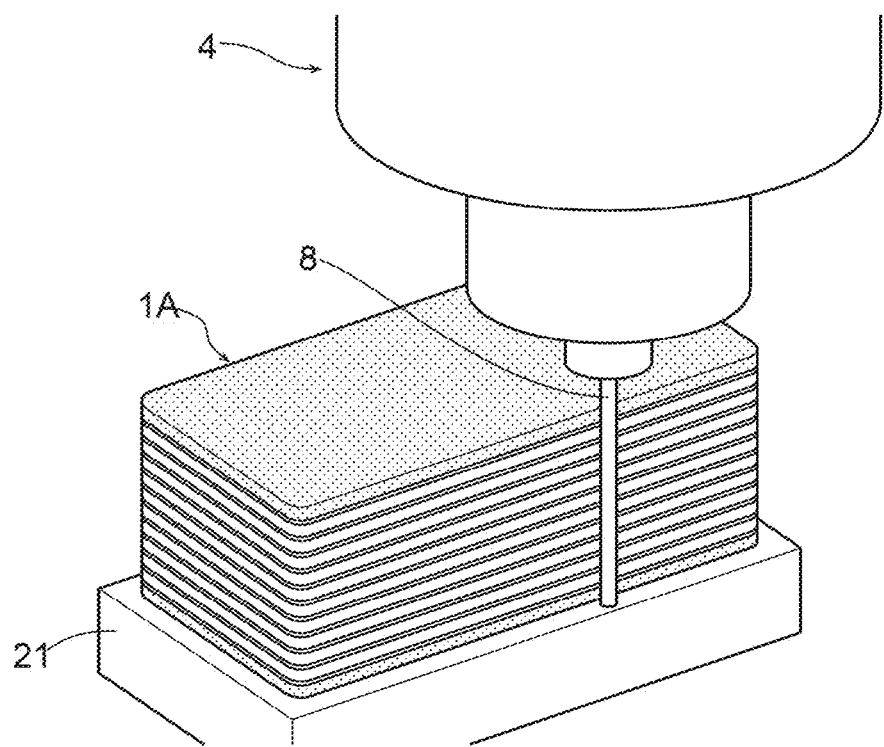
FIG. 12 An explanatory view showing grind processing to the outer periphery of the stacked block.

(3) As shown in FIG. 10, grind processing is performed, by employing the above-mentioned ultrasonic vibration processing apparatus 4, for cutting out a plurality of pieces (stacked block 1a) having a size for protection glass of portable terminals and for forming long holes 23 and square holes 24 in the respective stacked blocks 1a as shown in FIG. 11. After the cut-out of the stacked blocks 1a from the stack 1A, which removes all except for the stacked blocks 1a from the stack 1A, polish processing for finishing is performed to the periphery of the respective stacked blocks 1a, the long holes 23 and the square holes 24. The respective stacked blocks 1a remain fixed on the fixing base 21 based on the sucking action. In FIG. 12, as a matter of convenience, the fixing base 21 is scaled down, and the long holes 23 and the square holes 24 formed in the stacked block 1a are not shown.

The feedback control is conduced in the polish processing and the grind polishing of the stacked block which employs the ultrasonic vibration processing apparatus 4 for bringing the vibration amplitude and the number of vibrations close to the target vibration amplitude and the target number of vibrations, respectively. In order to basically prevent the occurrence of the cracks and the chippings of the tempered glass even if the stress is slightly changed in the tempered glass during the processing, the target vibration amplitude and the target number of vibrations are used which are outside of the range where the value of degrading the quality of the tempered glass (standard of generating cracks and chipping in the tempered glass over specified degrees) is generated, and the value changes along the thickness direction of the tempered glass during the processing.

Specifically, the target vibration amplitude of the processing device 8 is set in the preferable range from 3 µm to 9 µm, for example, 8 µm, and the target number of vibrations of the processing device 8 is set in the preferable range from 60 kHz to 64 kHz, for example, 63 kHz. The reasons why the target vibration amplitude of the processing device 8 is set in the range from 3 µm to 9 µm, and why the target vibration frequency is set in the range from 60 kHz to 64 kHz are mentioned above. The sample cycle of 0.2 msec which is below 0.3 msec is used in the feedback control in this case for properly preventing the generation of the cracks in the tempered glass by rapidly grasping the stress change occurring in the tempered glass and by reducing the stress to the tempered glass.

In this case, the processing device 8 is rotated under the number of rotations of 5000 rpm which belongs to a range from 2000 rpm to 30000 rpm for obtaining preferable effects of the rotation together with sufficiently producing the effects of the ultrasonic vibration processing. The other processing conditions are those ordinarily employed.

(4) Then, after the polish processing, the stacked block 1a is subjected to the chemical treatment for strengthening the glass end surface by using hydrofluoric acid. Then, the block 1a is dipped into warm water, and the respective tempered glasses 1 are peeled off. Thereby, the processed tempered glass can be obtained as a final product (such as protection glass for portable terminal).

EXAMPLES

4. The quality of the test glass prepared by employing the present method (above processing apparatus) and the quality of another test glass of Comparative Example prepared by employing the prior art method were compared with each other and evaluated.

Figure 13:
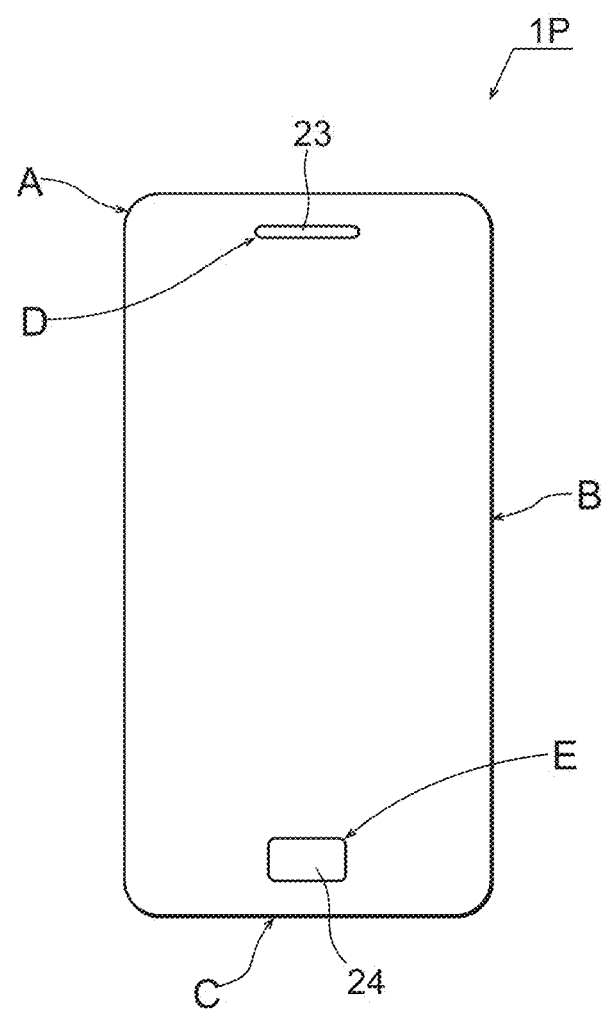
FIG. 13 A view showing a tempered glass for a mobile terminal.
Figure 15:
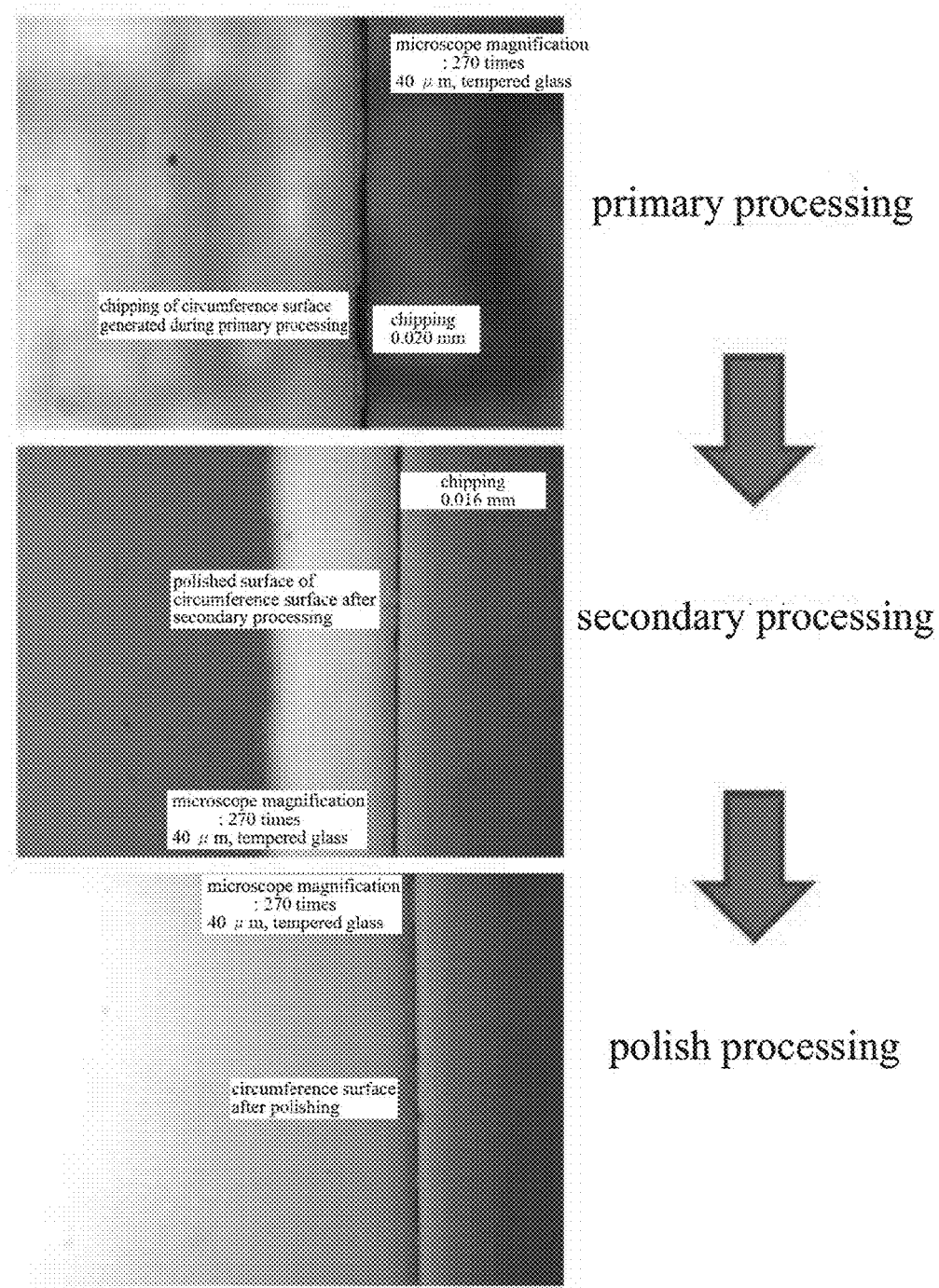
FIG. 15 Magnified photographs showing the part B of FIG. 13 (magnification: 270 times).
Figure 16:
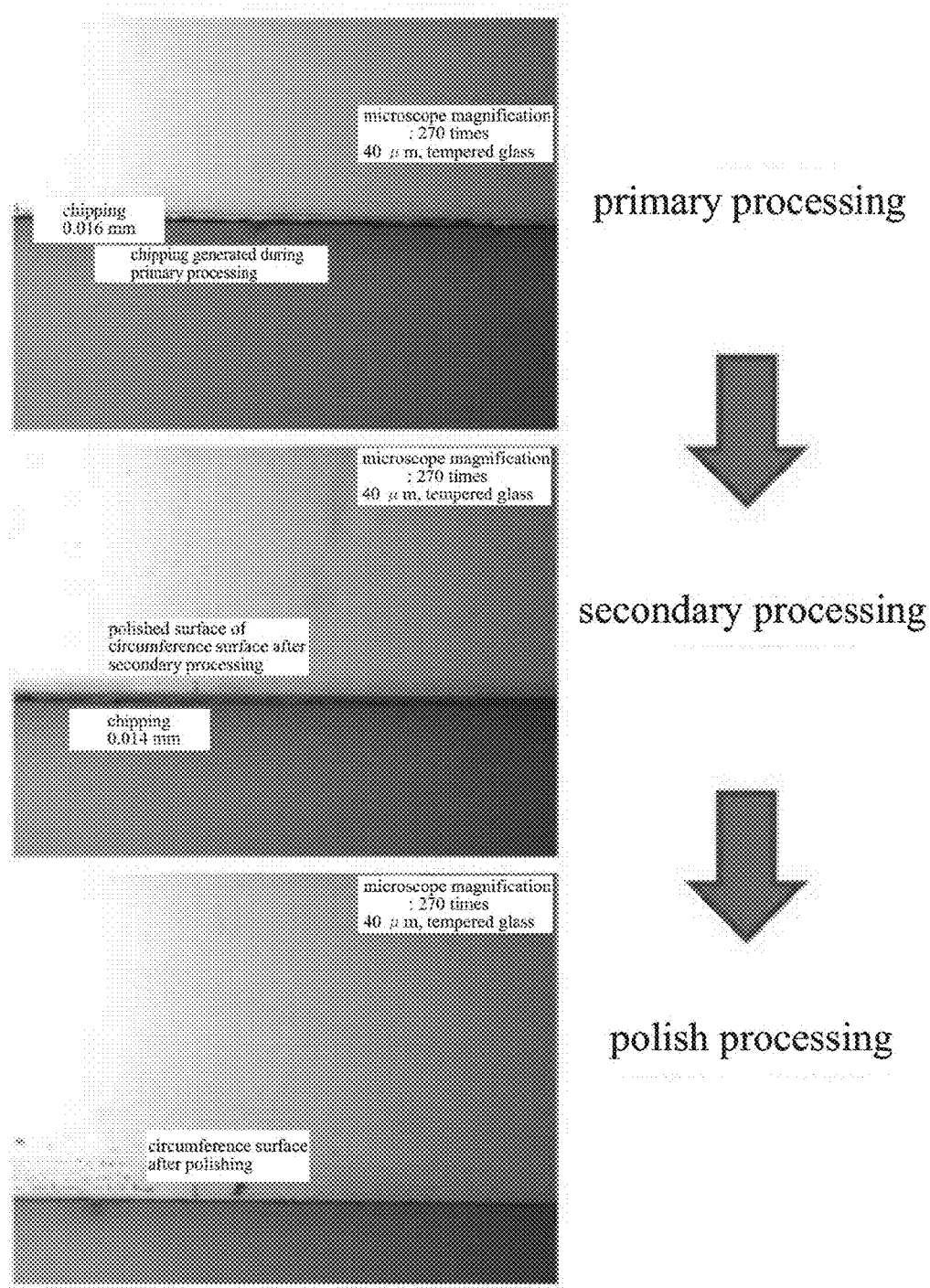
FIG. 16 Magnified photographs showing the part C of FIG. 13 (magnification: 270 times).
Figure 17:
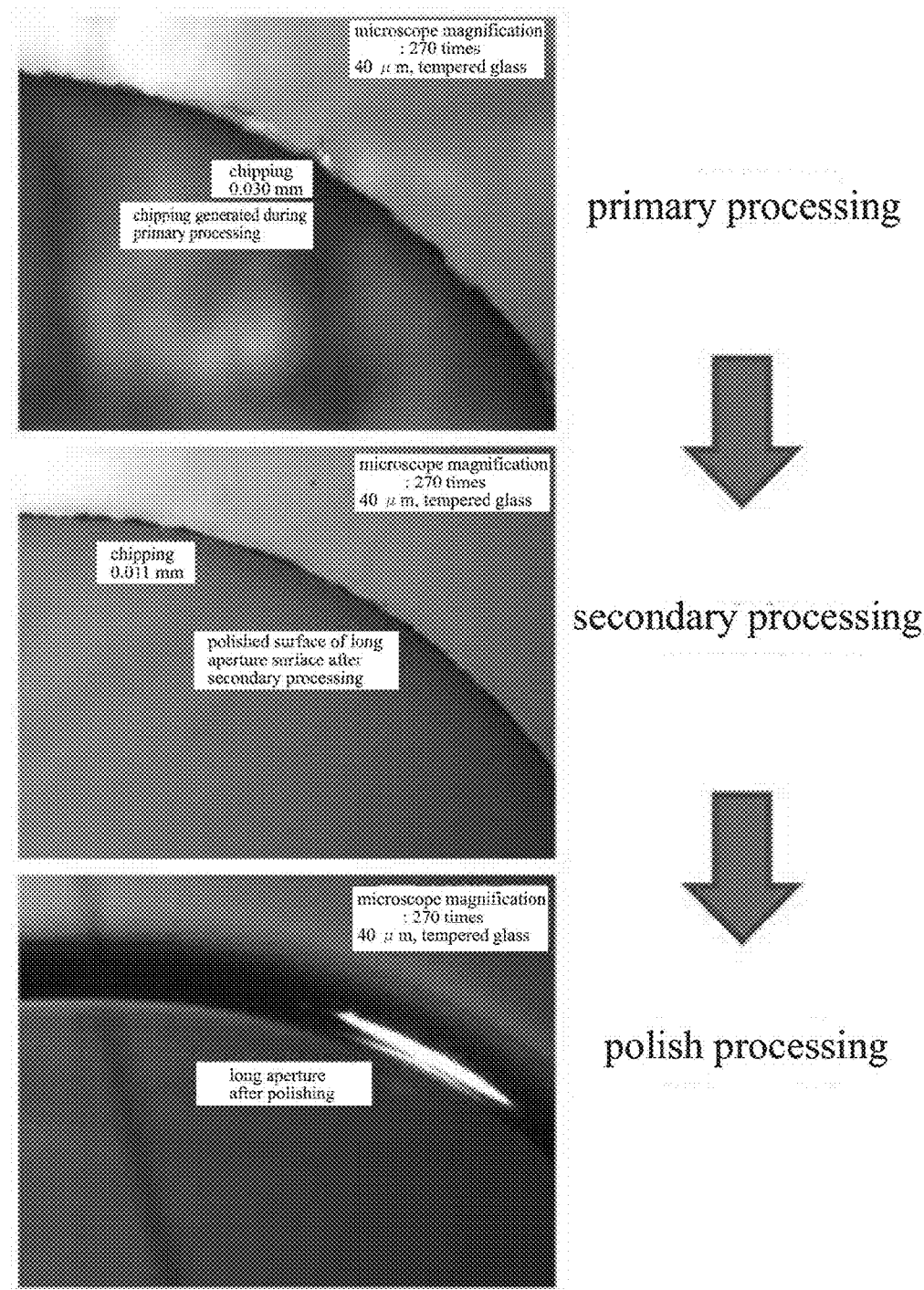
FIG. 17 Magnified photographs showing the part D of FIG. 13 (magnification: 270 times).
Figure 18:
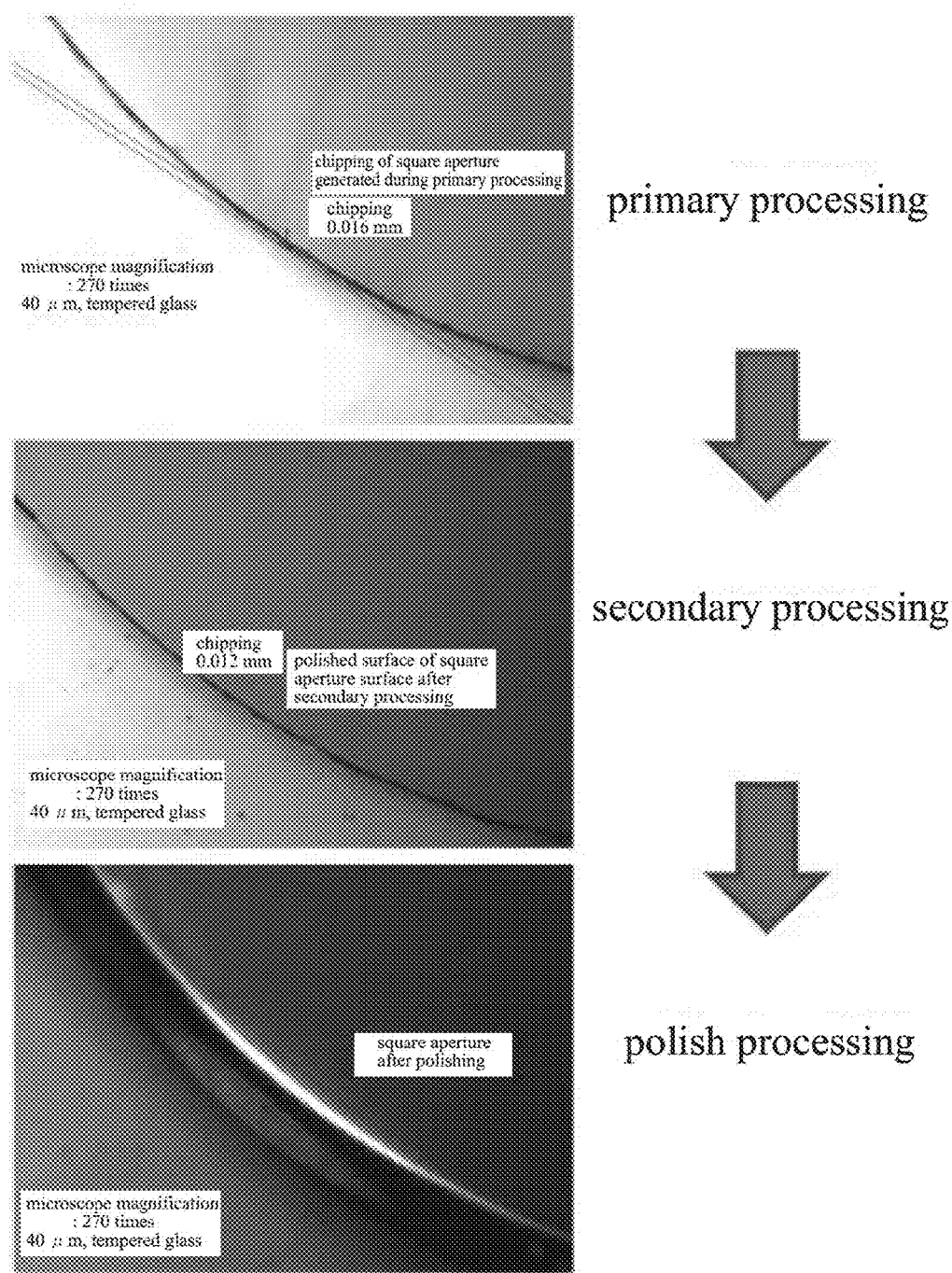
FIG. 18 Magnified photographs showing the part E of FIG. 13 (magnification: 270 times).

(1) In case of test glass prepared by employing the present method (i) Preparation of Test Glass Preparation of protection glass 1P for portable terminals acting as the test glass and shown in FIG. 13 was attempted.

(ii) Specific Method of Preparing Test Glass of Present Method and Conditions Thereof A method of preparing the test glass is the same as the method of processing the above tempered glass. That is, 12 sheets of the tempered glass (mother material was aluminosilicate glass, thickness of mother material was 0.7 mm, thickness of surface reinforced layer was 40 µm, and surface compression stress was 600 MPa or more) having the surface reinforced layer in the shape of a larger plate were stacked and fixed among one another by using a UV cure adhesive. Pieces (stacked block 1a) having the same size as that of protection glass of portable terminals were cut out from the stacked sheets. The polish processing (primary processing) of the long holes 23 and square holes 24 was conducted onto the above cut-out pieces to prepare primarily processed articles (stacks). Then, the finish processing (secondary processing) onto the primarily processed articles was performed for chamfering the circumferential surface, the long holes 23 and the square holes 24 to prepare secondarily processed articles (stacks). Then, the polish processing was conducted onto the secondarily processed articles, and the respective glass plates of the stacked block 1a after the above processing were dipped into warm water for peeling off, thereby obtaining the test glass (for evaluation).

The above-mentioned ultrasonic vibration processing apparatus 4 was employed in the primary processing and the secondary processing, and the conditions thereof are as follows.

Primary Processing Conditions

Processing Device 8

Type: diamond grindstone in form of shaft (grain size: #320)

Diameter: 1.5 mm

Feed speed: 60 mm/min.

Vibration amplitude: 8 μm

Number of vibrations: 63 kHz

Sample cycle (response speed) of feedback control; 0.2 msec

Number of rotations: 5000 rpm

Secondary Processing Conditions

Processing Device 8

Type: diamond grindstone in form of shaft (grain size: #600)

Diameter: 1.5 mm

Feed speed: 60 mm/min.

Vibration amplitude: 5 μm

Number of vibrations: 63 kHz

Sample cycle (response speed) of feedback control; 0.2 msec

Number of rotations: 5000 rpm (iii) Method of evaluating test glass prepared by present method and results of evaluation The processed conditions after the primary processing, after the secondary processing and after the polish processing of the respective parts A to E of the test glasses shown in FIG. 13 were examined.

As apparent from magnified photographs shown in FIG. 14 to FIG. 18 (270 times), the respective parts A to E of the test glass exhibited the excellent processed states in each of the processing stages (after the primary processing, after the secondary processing and after the polish processing).

(2) In case of test glass prepared by employing prior art method (i) Preparation of Test Glass Similarly to the case of the test glass prepared by the present method, the preparation of protection glass for portable terminals acting as the test glass shown in FIG. 13 was attempted.

(ii) Specific Method of Preparing Test Glass by Prior Art Method and Conditions Thereof Similarly to the preparation of the present method, the stack consisting of 12 sheets in the shape of larger plates (the tempered glass having the surface reinforced layer) adhered among one another was prepared, and the primary processing (cut-out of the stacked block 1a, and processing of the long holes 23 and square holes 24) onto the stack under the primary processing conditions below was tried. However, a plurality of cracks were generated after the cut-out of the stacked block 1 and in the early stage of processing the long holes 23 during the primary processing. Accordingly, the subsequent processing including the processing of the square holes 24 in the primary processing was abandoned for the parts (refer to part D and part E in FIG. 13) regarding the aperture processing of the test glass of Comparative Example. Although the secondary processing and the polish processing were conducted onto the part B and the part C among the parts with respect to the circumferential surface (refer to part A to part C in FIG. 13) of the test glass of Comparative Example, the subsequent processing of part A was abandoned because of the crack generation.

Primary Processing Conditions

Processing Device 8

Type: diamond grindstone in form of shaft (grain size: #320)

Diameter: 1.5 mm

Feed speed: 60 mm/min.

Vibration amplitude: 8 μm

Number of vibrations: 50 kHz

Sample cycle (response speed) of feedback control; 10 msec

Figure 20:
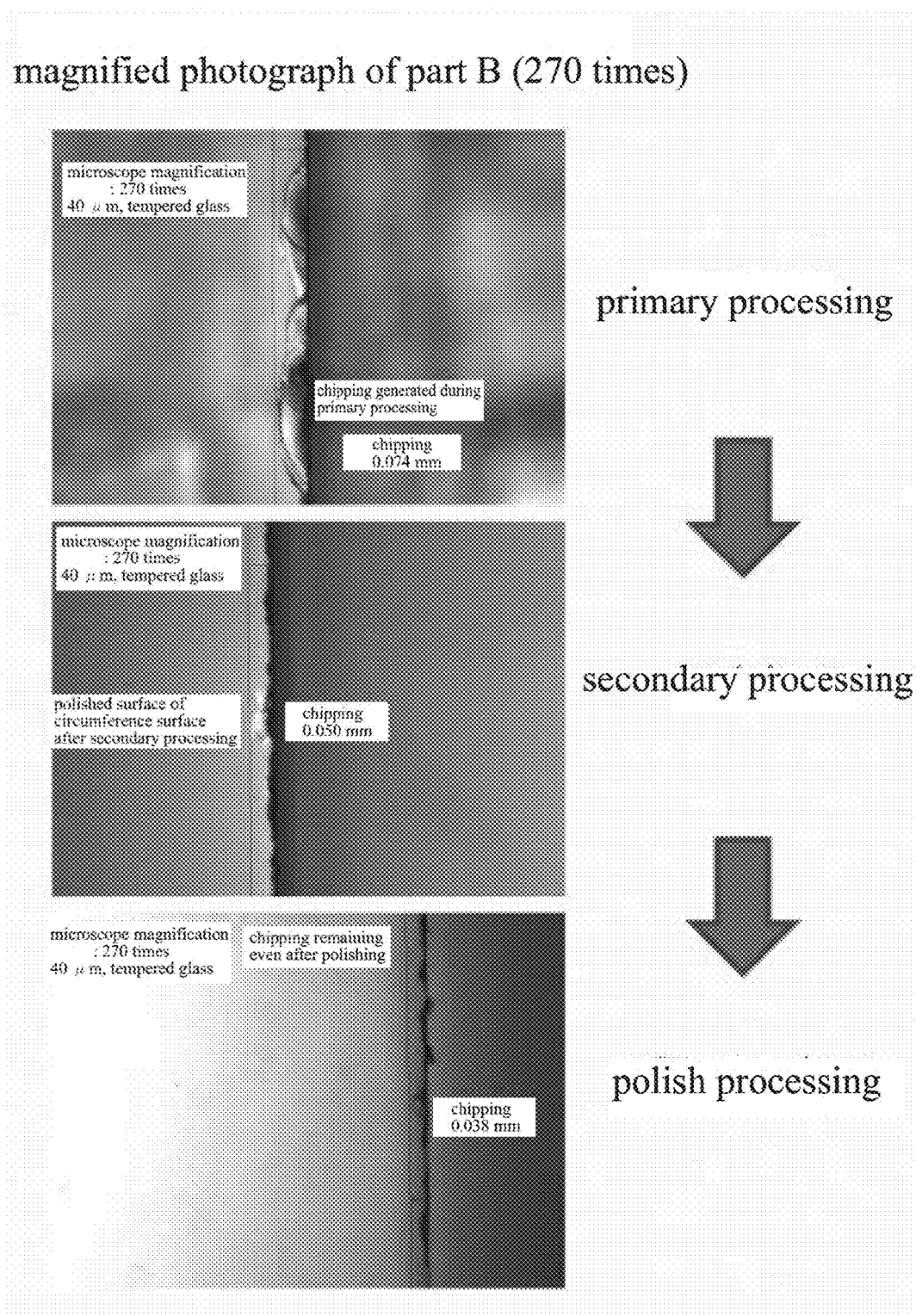
FIG. 20 Magnified photographs showing the part of the protection glass for the portable terminal of Comparative Example which corresponds to the part B of FIG. 13 (magnification: 270 times).
Figure 21:
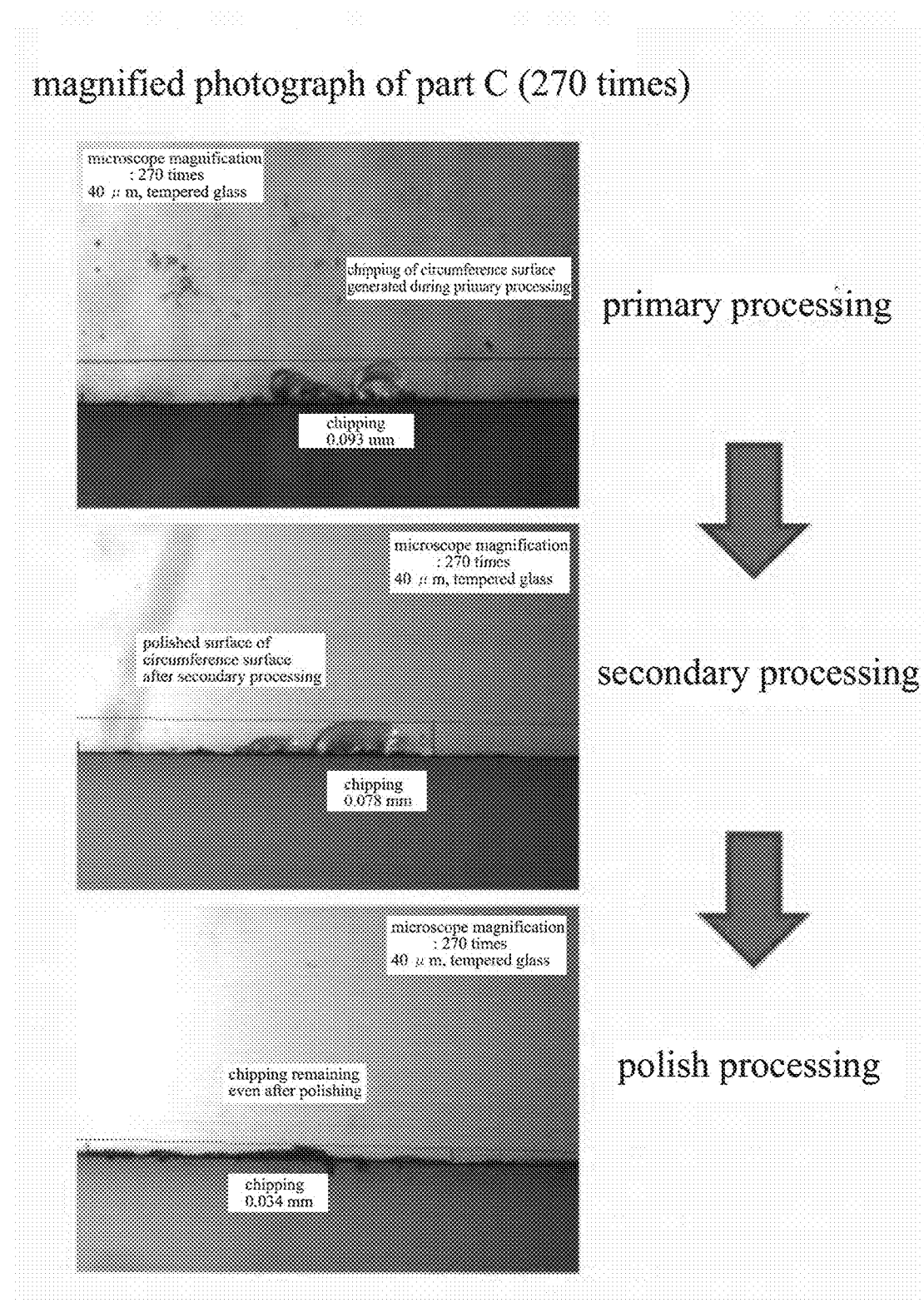
FIG. 21 Magnified photographs showing the part of the protection glass for the portable terminal of Comparative Example which corresponds to the part C of FIG. 13 (magnification: 270 times).
Figure 22:
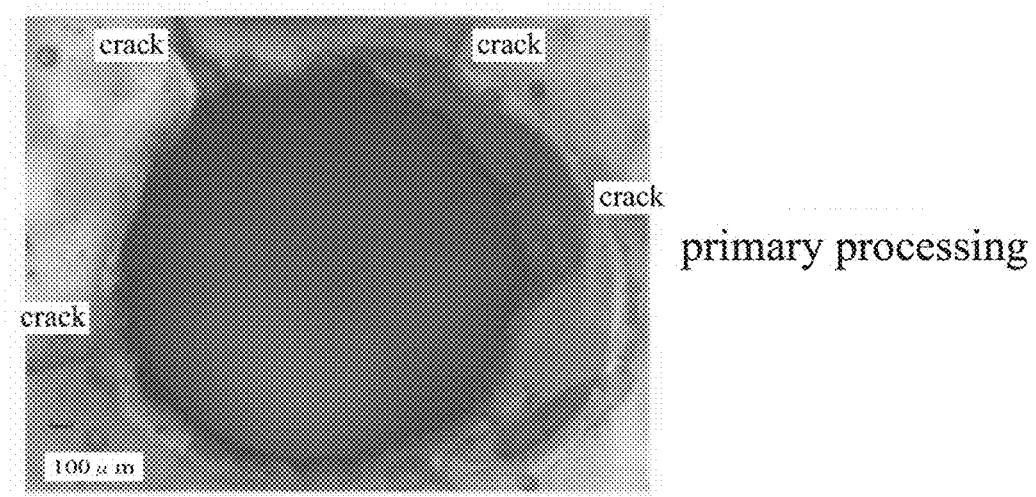
FIG. 22 A magnified photograph showing the part of the protection glass for the portable terminal of Comparative Example which corresponds to the part D of FIG. 13 (magnification: 90 times).

Number of rotations: 5000 rpm (iii) Method of Evaluating Test Glass of Comparative Example and Results of Evaluation Examination of the processed conditions after the primary processing of the respective parts A to D (refer to FIG. 13) of the test glass of Comparative Example provided magnified photographs of FIG. 19 to FIG. 21 (270 times) and of FIG. 22 (90 times). Cracks or chippings over a specified degree were generated at the respective parts A to C of the test glass of Comparative Example, and a plurality of larger cracks were generated at the part D so that the quality thereof was too bad to be supplied as a finished article. A larger central aperture in FIG. 22 was made during the initial stage before the formation of the long holes 23.

Another embodiment is shown in FIGS. 23 to 39. In this embodiment, the description of the configuration elements the same as those in the above embodiment will be omitted by attaching the same numerals.

Figure 23:
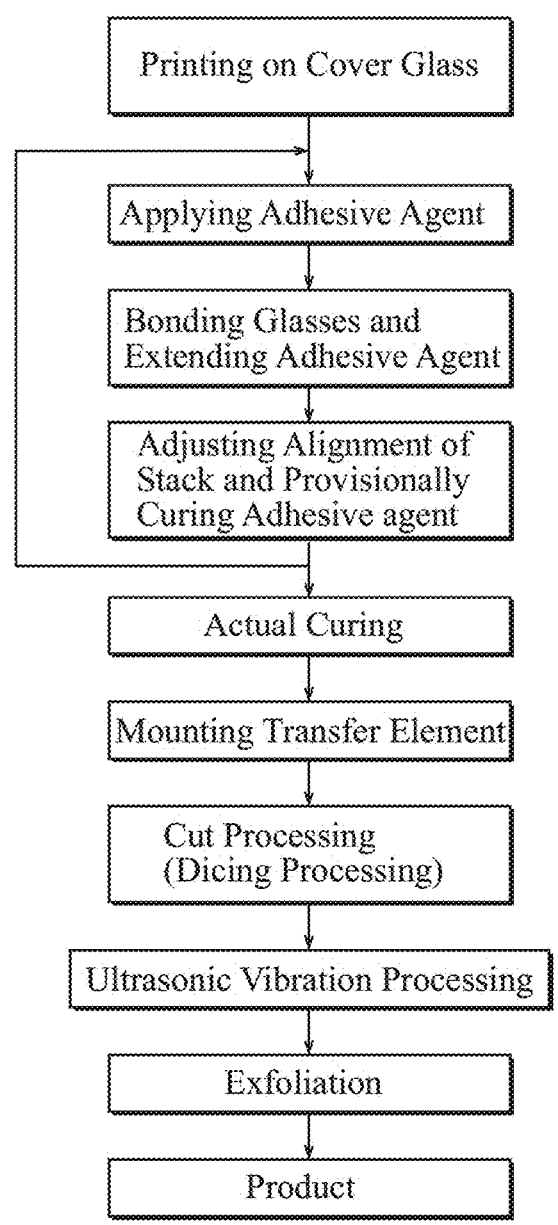
FIG. 23 An operation flow chart showing operations of another embodiment.

This embodiment illustrates a specific processing method (manufacturing method) which efficiently produces a protective glass as a finished product such as a mobile terminal and a tablet by effectively utilizing the above-mentioned ultrasonic vibration processing apparatus 4, and FIG. 23 shows an operation flow chart showing its processing method.

Figure 24:
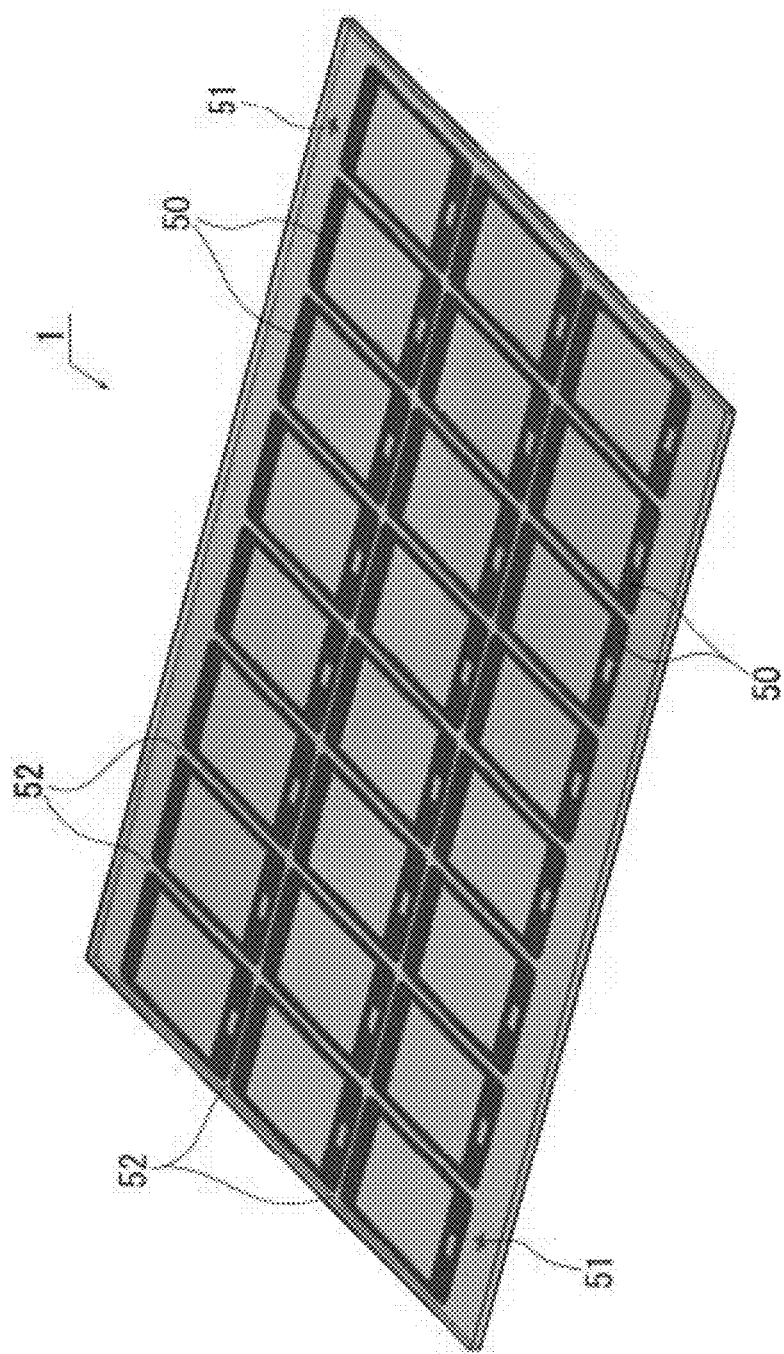
FIG. 24 A perspective view showing a large substrate (chemical tempered glass) on which frame-shaped patterns and alignment marks are printed FIG. 25 An explanatory view showing "a step of printing to a cover glass".

In this processing method, as a tempered glass 1 having a surface reinforced layer 3 (thickness of mother material was 0.7 mm, thickness of surface reinforced layer was 40 μm or more, and surface compression stress was 600 MPa or more), a large substrate (hereinafter designated by 1) having an increased size of the tempered glass is prepared. Since, as described later, the large substrate 1 is intended to be used as a stack 1A or a plurality of the large substrates are bonded in a stacked state so that a plenty of the large substrates are prepared in advance. As shown in FIG. 24, the large substrates 1 are formed in a square-shape at a planar view, and a plenty of frame-shaped patterns 50 (frame-shaped pattern group) and two alignment marks 51 acting as position-adjusting marks are printed in advance. The frame-shaped patterns 50 are intended to occupy periphery parts of the protection glasses such as mobile terminals and tablets, and the protection glasses are used in the mobile terminals and tablets, the frame-shaped patterns 50 partition square-shaped display screens therein. These numerous frame-shaped patterns 50 are the same and align in multiple columns lengthwise and breadthwise on the large substrate 1, and slight spaces 52 linearly extending are formed between the respective columns of the frame-shaped patterns 50 for permitting the cut processing by a dicing blade. The alignment marks 51 are formed on vicinities of each of a pair of opposing sides (longer side) of two pairs of the periphery of the large substrate 1, and both of the alignment marks 51 are spaced from each other in the direction of forming the other pair of the opposing sides (shorter side). These two alignment marks 51 have specified positional relationship with respect to the numerous frame-shaped patterns 50, and the specified positional relationships between the numerous frame-shaped patterns 50 and the two alignment marks 51 are common in the respective large substrates 1.

In this embodiment, a cover glass 1*n* is provided for constituting outermost surfaces (front surface, rear surface) of the above-mentioned stack 1A. An ordinary glass without a surface reinforced layer different from the chemical tempered glass is used as the cover glass 1*n*, and the dimension of the cover glass 1*n* is the same as that of the large substrate 1. This cover glass 1*n* is transparent and includes no printing on its outer surface.

Figure 25:
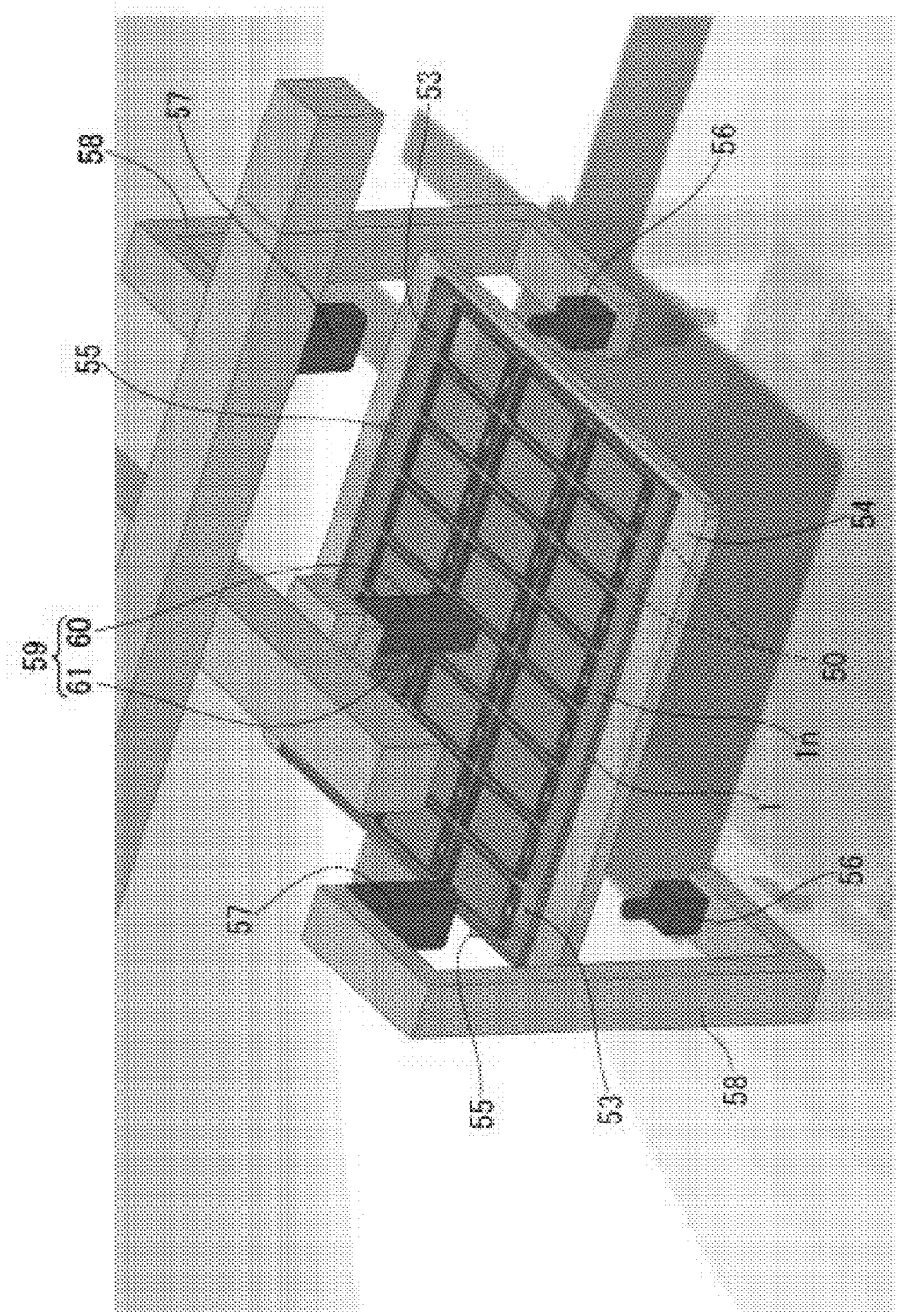

(2) Under this preparation, as shown in FIGS. 23 and 25, at first, "a step of printing the cover glass 1*n*" is performed in the processing method of the present embodiment.

In this step, a square-shaped first base table 54 at a planar view, two position-determining pins 55 mounted on the first base table 54, two detection cameras 56 positioned at both sides in the breadth direction of the first base table 54 under the first base table 54, and two ink jet heads 57 for mark printing which correspond to the respective detection cameras 56 are mounted over the first base table 54 for implementing this step.

The first base table 54 includes a flat top surface for mounting the large substrate 1, and its shape of the top surface resembles a shape (planar shape) of the large substrate, and is slightly larger than the large substrate 1. Accordingly, when a worker sees the shape of the top surface of the first base table 54, he can comprehend how the large substrate 1 is arranged with respect to the top surface.

The two position-determining pins 55 are arranged on the top surface of the first base table 54 such that one position-determining pin 55 is arranged on vicinities of one of the pair of the opposing sides (longer side), and the other position-determining pin 55 is arranged on vicinities of one of the other pair of the opposing sides (shorter side). When the large substrate 1 is placed on the first base table 54 and the outer peripheral surface of the large substrate 1 is in contact with the two position-determining pins 55, one of the position-determining pins 55 is in contact with the longer side part and the other position-determining pins 55 is in contact with the shorter side part of the large substrate 1 so that the position of the large substrate 1 on the first base table 54 is specifically determined.

The respective detection cameras 56 are mounted on moving units 58 which are movable manually by the worker, and the respective detection cameras 56 are movable under the first base table 54 by the movement of the respective moving units 58. The respective detection cameras 56 have a function of shooting an upper region, and the shot content is displayed on a monitor (not shown) together with a standard mark showing a shooting center (positioned on the axis line of the detection camera).

The respective ink jet heads 57 for mark printing are mounted on each of the moving units 58. The respective ink jet heads 57 are positioned (on the same axis line) opposing to the respective detection cameras 56 over the detection cameras 56, and the respective ink jet heads 57 move synchronizing with the respective detection cameras 56 over the first base table 54 by the movement of the respective moving units 58.

For implementing this step under the above configuration, at first, the large substrate 1 (on which the numerous frame-shaped patterns 50 are printed) is placed on the first base plate 54, and then the cover glass 1*n* is placed on the large substrate 1. After both of the outer peripheral surfaces of the stacked large substrate 1 and the cover glass 1*n* are in contact with the two position-determining pins 55 on the top surface of the first base table 54, the position of the stacked large substrate 1 and the cover glass 1*n* on the first base table 54 is specifically determined by both of the position-determining pins 55.

After the specific position of the large substrate 1 and the cover glass 1*n* on the first base table 54 is determined, the respective moving units 58 are moved by a worker to place the respective detection cameras 56 (axial center) and the respective alignment marks 51 of the large substrate 1 on the same axis line extending vertically.

An opening (not shown) is formed in a region where the formation of the respective alignment marks on the large substrate 1 is expected, and the respective detection cameras 56 can conduct the detecting operation of the respective alignment marks 51 through the opening. For determining the moving position of the moving units 58 by the worker, the position between the alignment mark 51 displayed on a monitor based on an output signal from the detection camera 56 and the standard mark (the mark on the monitor showing the center of an image, not shown) is determined.

After the positional adjustment of the respective detection cameras 56 (the standard mark on the monitor) with respect to the respective alignment marks 51, the ink jet head 57 is descended by the moving unit 58, and position-adjusting marks 53 are printed on the cover glass 1*n* by the ink jet head 57. Thereby, the position-adjusting marks 53 printed on the cover glass 1*n* are overlapped with the alignment marks 51 of the large substrate 1.

As shown in FIG. 25, a printing unit 59 is also provided which is movable in the longitudinal direction and the width direction in this step. The printing unit 59 is provided with an ink jet head 60 performing the printing on the cover glass 1*n* and a curing lamp unit 61 for curing the ink. The printing unit 59 moves with respect to every frame-shaped pattern 50 of the large substrate 1 on the cover glass 1*n* based on the positional information of the above detection camera 56 (the position of the alignment mark 51), and can delicately move in the respective frame-shaped patterns 50 for the printing and the curing. The ink jet head 60 of this printing unit 59 prints scheduled processing conditions input to a control unit (memory means) not shown in addition to a product management number in the respective frame-shaped patterns 50, and the comparison between the printed content and the final processing result (the processing result after completion of the ultrasonic vibration processing) provides a plenty of the processing conditions for obtaining an excellent product glass.

After the printing of the position-adjusting marks 53 to the cover glass 1*n*, the cover glass 1*n* is removed and a new cover glass 1*n* is then placed on the large substrate 1 placed on the first base table 54. Thereafter, similar procedures to those described above are performed to this new cover glass 1*n* to print the position-adjusting marks 53 to this new cover glass 1*n*.

In FIG. 25, the transparency of the cover glass 1*n* enables the visualization of the numerous frame-shaped patterns 50 printed on the large substrate 1 through the cover glass 1*n*.

(3) As shown in FIG. 23, "the step of applying the adhesive agent" is then performed for changing the processing subject to the stack 1A formed by a plurality of the stacked large substrates 1. Especially, in this embodiment, the stack 1A including the uppermost and the lowermost cover glasses 1*n* is employed.

Figure 26:
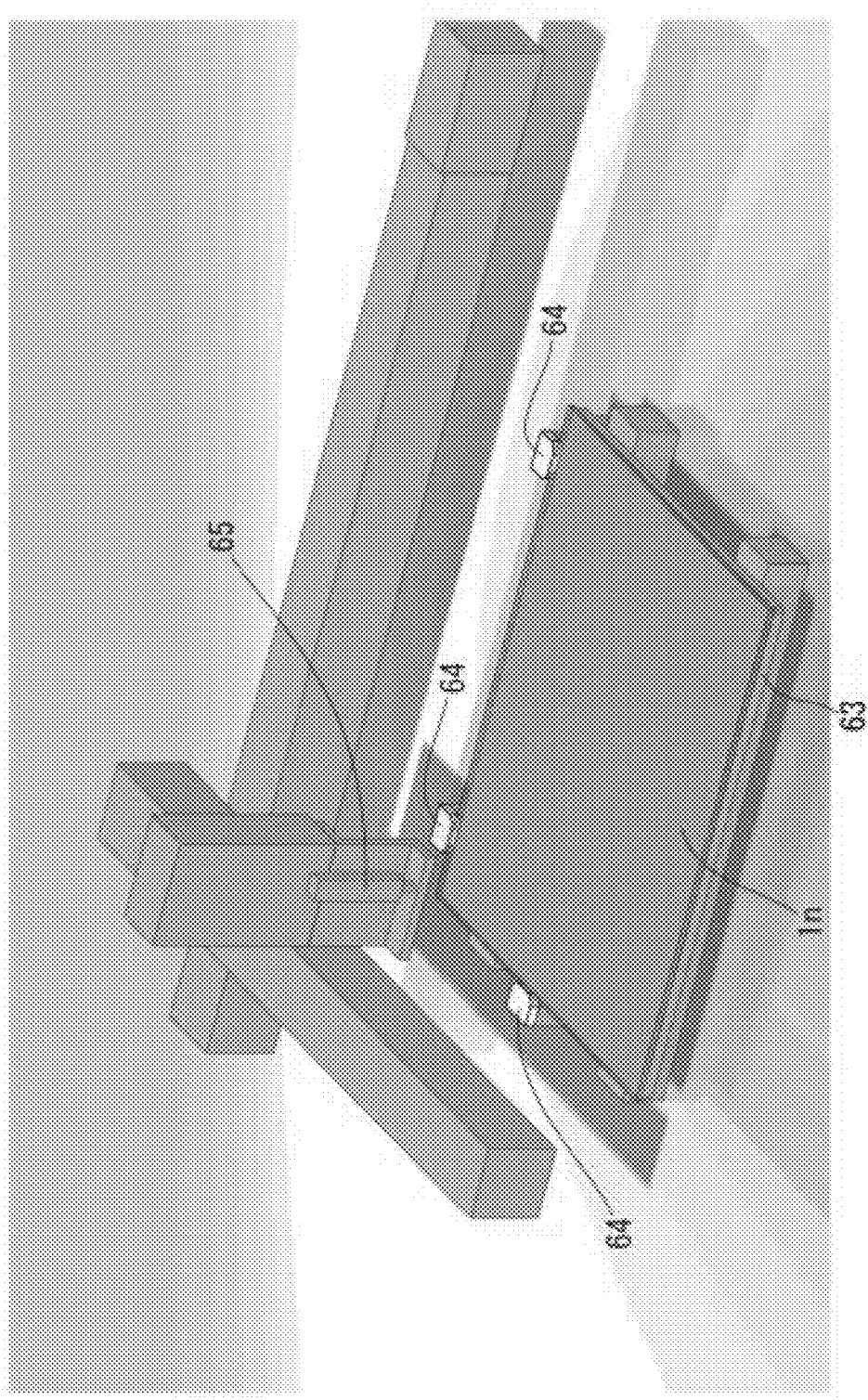
FIG. 26 An explanatory view showing a situation in which an adhesive agent is applied to the cover glass in "a step of applying the adhesive agent".

In this step, as shown in FIG. 26, the cover glass 1*n* (on which the position-adjusting marks 53 are printed) which will be the lowermost of the stack 1A is placed on a second base table 63, and the position of the cover glass 1*n* is determined by contacting the cover glass 1*n* to position-determining blocks 64 arranged on a partial periphery of the second base table 63. An adhesive agent having a specified pattern is applied to this cover glass 1n on the second base table 63 by using a movable dispenser 65 for applying the adhesive agent.

The adhesive agent preferably includes a UV cure adhesive agent which is cured with ultraviolet rays and soluble in warm water because the adhesive agent is required to be rapidly cured and thereafter to be exfoliated from the cut-out respective pieces of the tempered glass.

Although the bottom side of the cover glass 1n is shown to be invisible for apparently presenting the existence of the cover glass 1n in FIG. 26, the cover glass 1n is transparent.

(4) Then, "a step of bonding glasses and extending adhesive agent" is implemented as shown in FIG. 23.

Figure 27:
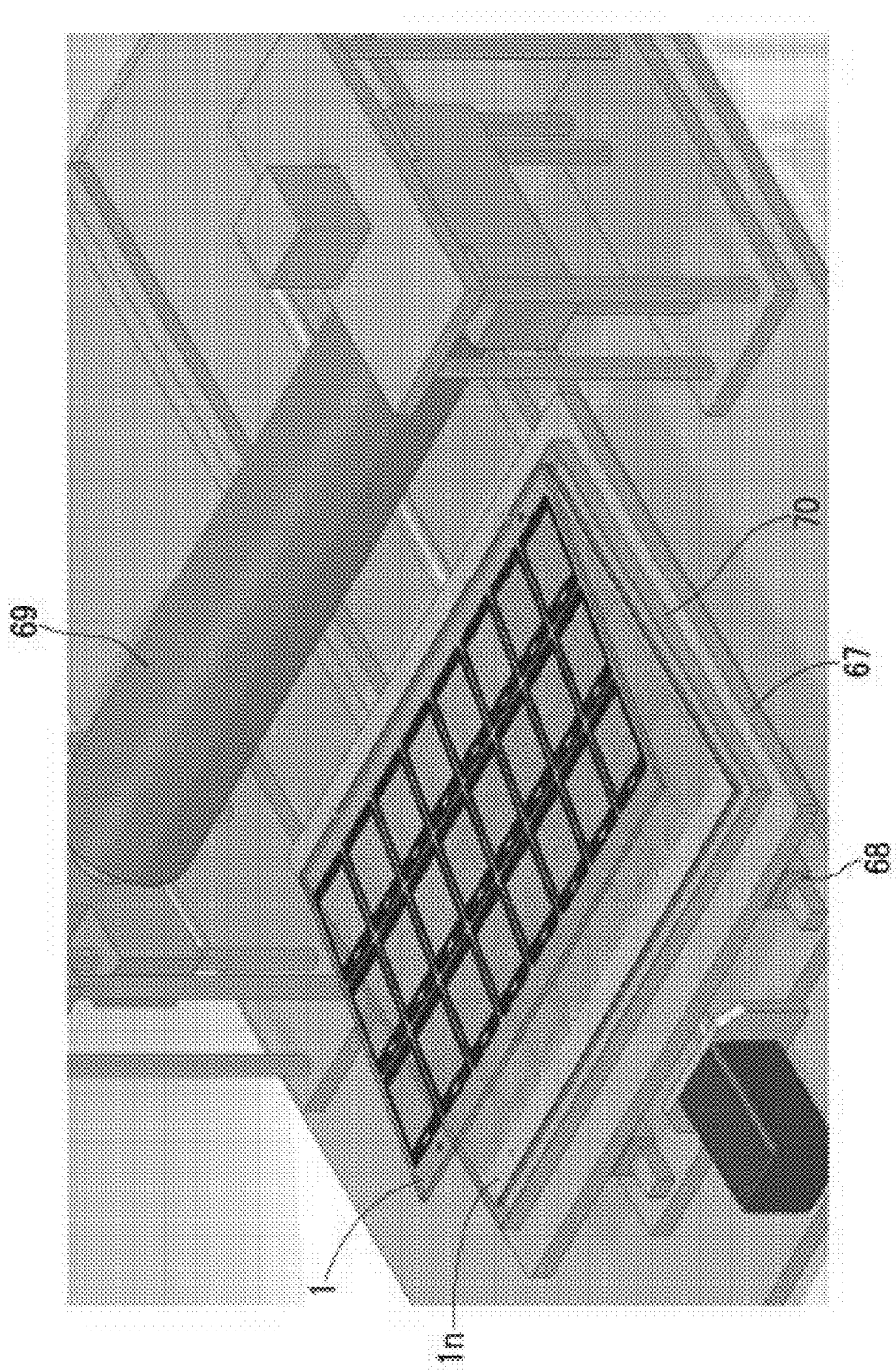
FIG. 27 An explanatory view showing "a step of bonding the glasses and extending the adhesive agent".

In this step, as shown in FIG. 27, the cover glass 1n to which the adhesive agent has been applied in the previous step is placed on a third base plate 67 while the adhesive agent applied-surface faces upward. After the position determination of the cover glass 1n by the position-determining pins not shown, the cover glass is fixed under suction to the third base table 67 by using a vacuum suction apparatus (not shown). Then, after the large substrate 1 is superposed on the cover glass 1n on the third base table 67, the third base table 67 carrying these is moved toward a roller 69 by means of a conveying unit 68. This movement rolls the adhesive agent between the cover glass 1n and the large substrate 1, and the adhesive agent protruding from both of the glasses 1n, 1 is recovered to a scraper-adhesive agent recovering tray 70.

(5) Then, "a step of adjusting alignment of the stack and provisionally curing the adhesive agent" is implemented as shown in FIG. 23.

Figure 28:
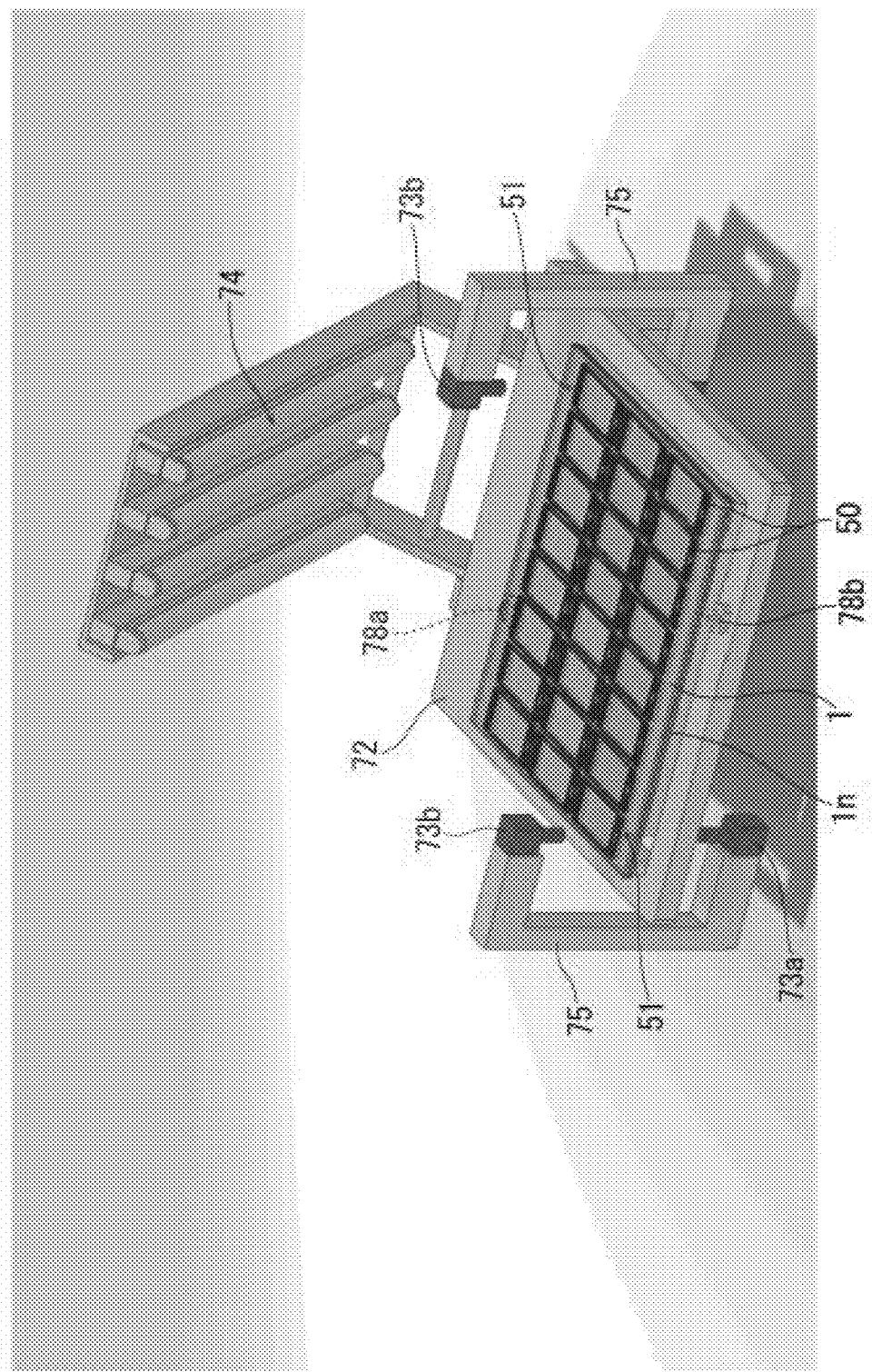
FIG. 28 An explanatory view showing "a step of adjusting alignment of a stack and provisionally curing the adhesive agent".

As shown in FIG. 28, in this step, a square-shaped fourth base table 72 at a planar view acting as an adjusting base table, two pairs of detection cameras 73a, 73b (position-adjusting section) vertically sandwiching the fourth base table 72 therein, and a lamp apparatus 74 for provisionally curing the adhesive agent is provided for implementing the step.

The fourth base table 72 includes a flat top surface on which the above large substrate 1 and the cover glass 1n can be placed, and a block for guiding an arrangement region (not shown) is mounted on the top surface for notifying the worker of the orientation of the brief arrangement and the arrangement region. Based on this, considering an arrangement supposed region of the respective alignment marks 51 of the large substrate 1, an opening (not shown) slightly larger than the arrangement supposed region is formed in the fourth base table 72. Another opening (not shown) is properly formed other than the above opening in the fourth base table 72, and the former opening is connected to a vacuum suction apparatus (not shown).

As shown in FIG. 28, the respective sets of the pair of the detection cameras 73a, 73b are mounted on a support element 75 which has a fixing relation with the fourth base table 72, and are fixed with respect to the fourth base table 72. One pair of the respective sets of the pair of the detection cameras 73a, 73b are arranged under the fourth base table 72 acting as bottom side detection cameras 73a, and the other pair are arranged over the fourth base table 72 acting as top side detection cameras 73b. The bottom side detection cameras 73a and the top side detection cameras 73b are arranged opposing to each other, and the image centers of both of the cameras 73a, 73b are established to be arranged on the same axis line extending vertically.

The two sets of the detection cameras 73a, 73b are arranged at the both sides in the width direction of the fourth base table 72 to be separated in the longitudinal direction in a planar fashion, and the planar distance between the both sets of the detection cameras 73a, 73b (the distance between intersections formed by the axis line between the bottom side detection cameras 73a and the top side detection cameras 73b of the respective sets and the fourth base table 72) are the same as the distance between the two alignment marks 51 of the above large substrate 1. When the large substrate is positioned on the fourth base table 72 and the respective alignment marks 51 are positioned on the axis line between the bottom side detection cameras 73a and the top side detection cameras 73b of the respective sets, the large substrate 1 is positioned in the fourth base table 72, and an arrangement is generated such that the shorter side of the large substrate 1 extends along the shorter side of the fourth base table 72, and the longer side of the large substrate 1 extends along the longer side of the fourth base table 72.

The lamp apparatus 74 for the provisional curing radiates radiation rays which promote the curing of the adhesive agent. Since the UV cure adhesive agent is used for bonding the cover glass 1n with the large substrate 1 in the present embodiment, the lamp apparatus 74 for the provisional curing radiates ultraviolet rays. In this case, while the UV radiation by the lamp apparatus 74 cures the UV cure adhesive agent to a certain extent, the complete curing is not achieved.

Under this configuration, in order to implement this step, the cover glass 1n and the large substrate 1 bonded in the previous step is placed on the fourth base table 72 while the cover glass 1n is positioned at the bottom side. Then, the cover glass 1n is moved on the fourth base table 72 to place its position-adjusting marks 53 on the axis line of the respective sets of the bottom side detection cameras 73a. After this position adjustment, the cover glass 1n is suctioned and fixed to the fourth base table 72 by means of a vacuum suction apparatus (not shown).

On the other hand, the adhesive agent of the large substrate 1 placed on the cover glass 1n is not yet cured so that the large substrate 1 can move on the cover glass 1n. Using this movement, the respective alignment marks 51 are positioned on the axis lines of the respective sets of the top side detection cameras 73b. Of course, a worker watching a monitor performs the respective position adjustments in which the respective marks 51 (53) are accorded to the standard marks of the detection cameras 73. In this manner, the position of the cover glass 1n arranged on the bottom side is adjusted by the bottom side detection camera 73a and the position of the cover glass 1n arranged on the top side is adjusted by the top side detection camera 73b so that the higher accuracy of the position adjustment can be secured even if the transparency of the cover glass 1a and the large substrate 1 is reduced due to the adhesive agent existing therebetween without the reduction of the accuracy of the position adjustment when either of the bottom side or the top side detection camera 73 is used.

When the position-adjusting mark 53 on the cover glass 1n and the alignment mark 51 on the large substrate 1 are aligned, the lamp apparatus 74 for the provisional curing radiates ultraviolet rays so that the cover glass 1n and the large substrate are provisionally bonded with each other with a bonding strength at a certain degree or more. While this provisional bonding takes place based on the provisional curing of the adhesive agent, the cover glass 1n and the large substrate 1 cannot be easily exfoliated or displaced by a human power.

Figure 29:
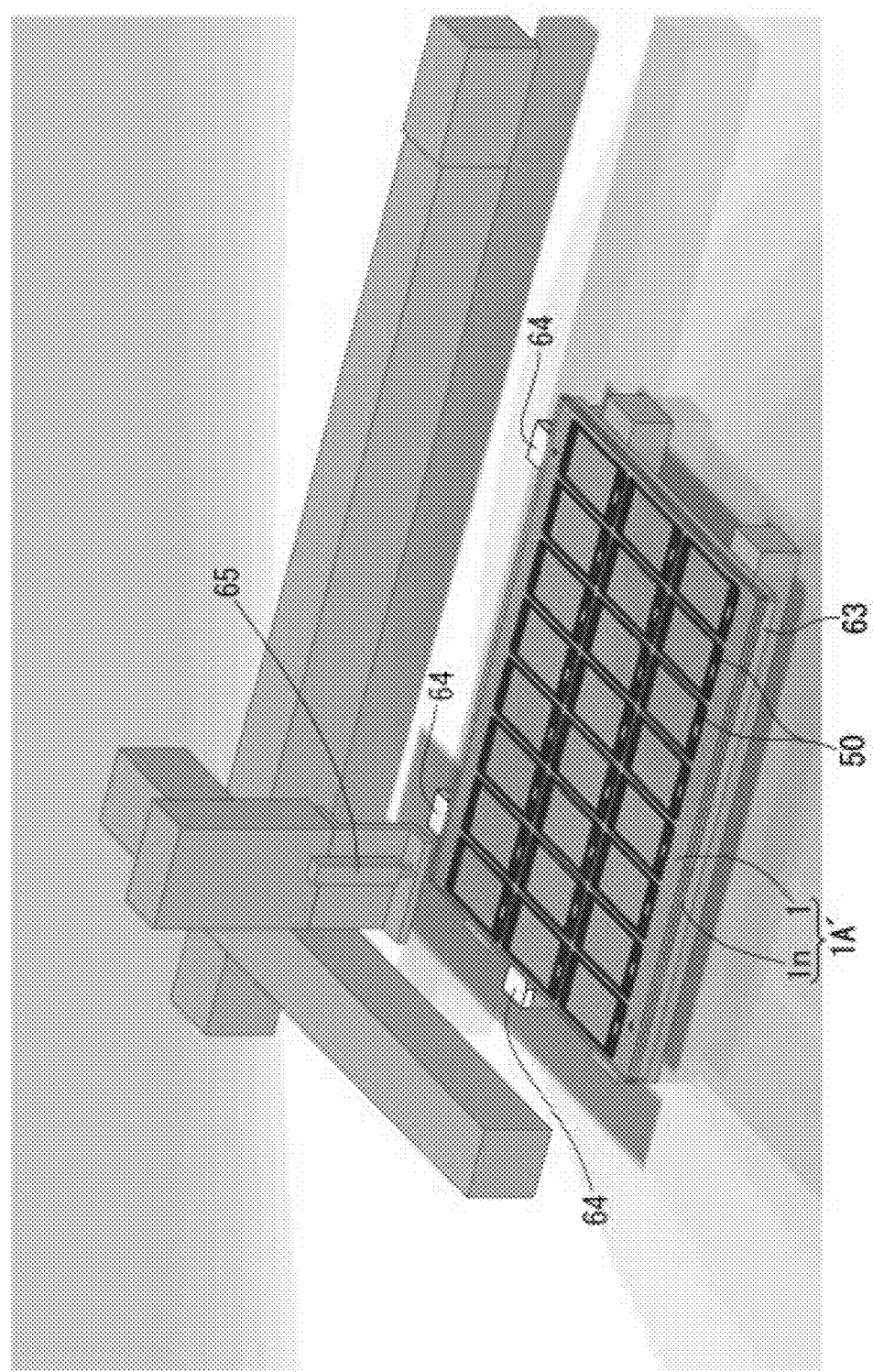
FIG. 29 An explanatory view showing a situation in which the adhesive agent is applied to the large substrate in "the step of applying the adhesive agent".

After the completion of the provisional curing treatment between the cover glass 1n and the large substrate 1, they are returned to "the step of applying the adhesive agent" again as shown in FIGS. 23 and 29.

In this step, the provisionally integrated subject between the cover glass 1n and the large substrate 1 (hereinafter referred to as provisionally integrated subject 1A') is placed on the second base plate 63 such that the cover glass 1n is positioned on the bottom side, and the adhesive agent is applied to the large substrate (refer to FIG. 29) similarly to in the above "step of applying the adhesive agent" (refer to FIG. 26).

(7) Then, as shown in FIG. 23, the provisionally integrated subject 1A' in which the adhesive agent is applied to the large substrate 1 is again conveyed to "the step of bonding glasses and extending adhesive agent" as shown in FIG. 23.

In this step, the provisionally integrated subject 1A' in which the adhesive agent is placed on the third base table 67 such that the large substrate 1 on which the adhesive agent is applied is positioned on the top side, and after a new large substrate 1 is superposed on the above large substrate 1, the adhesive agent between the large substrates is rolled by using the roller 69 similarly to the above (refer to FIG. 27).

(8) Then, as shown in FIG. 23, the provisionally integrated subject 1A' after the previous step is again conveyed to "the step of adjusting alignment of the stack and provisionally curing the adhesive agent".

In this step, at first, the provisionally integrated subject to which the new large substrate has been stacked in the previous step is placed on the fourth base table 72 such that the cover glass is positioned on the bottom side. After the position-adjusting mark of the lowermost cover glass 1n is adjusted on the axis line of the bottom side detection cameras 73a similarly to the above, the cover glass 1n is suctioned and fixed to the fourth base table 72 by means of a vacuum suction apparatus (not shown).

When the cover glass 1n is suctioned and fixed to the fourth base table 72, the large substrate 1 currently disposed uppermost is moved such that the respective alignment marks 51 are positioned on the axis lines of the respective sets of the top side detection cameras 73b.

After this position adjustment, the adhesive agent between the new large substrate 1 and the bottom side large substrate 1 is again provisionally cured by using radiation rays of the lamp apparatus 74. Then, the provisionally integrated subject includes three components, that is, the cover glass 1n, the large substrate 1 and the large substrate 1.

(8) In this manner, as shown in FIG. 23, "the step of applying the adhesive agent", "the step of bonding the glasses and extending the adhesive agent" and "the step of adjusting alignment of the stack and provisionally curing the adhesive agent" are repeated, thereby the plurality of the large substrates 1 are stacked and bonded. Finally the cover glass 1n is bonded to the stacked large substrates 1, and the cover glasses 1n are disposed on the uppermost in addition to the lowermost.

Of course, at this stage, the frame-shaped patterns 50 of the respective large substrates 1, the alignments marks 51 of the respective large substrates 1 and the position-adjusting marks 53 of the cover glass 1n are superposed in alignment.

(9) When the stack including the specified number of large substrates 1 which are sandwiched by the uppermost and lowermost cover glasses 1n is obtained, the provisionally integrated subject 1A' is conveyed to an actual curing step as shown in FIG. 23.

Figure 30:
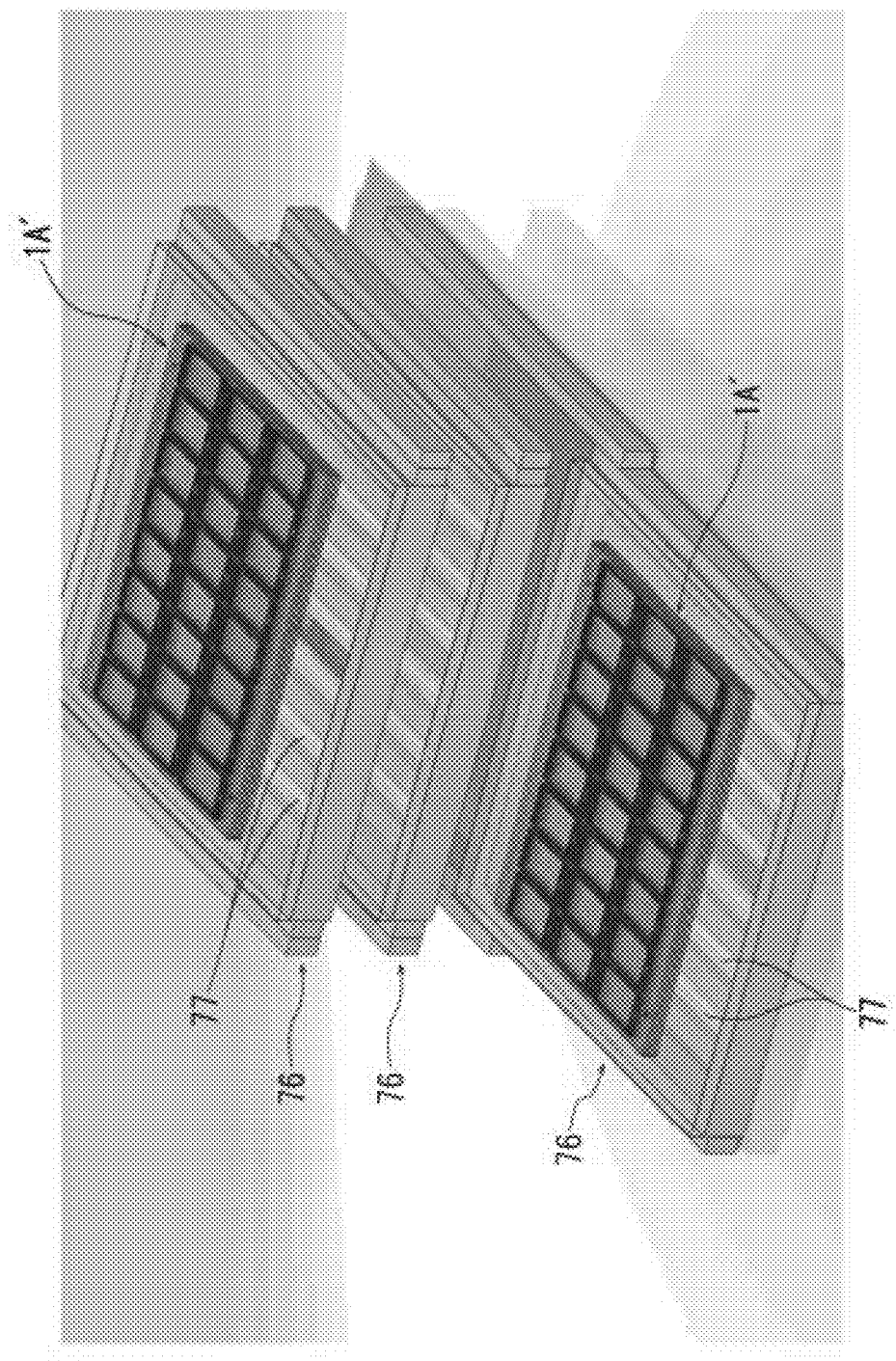
FIG. 30 An explanatory view showing "a step of actually curing" to a stack.

In this actual curing step, as shown in FIG. 30, sliding drawer units 76 are provided in each of which is equipped with a lamp 77 for actual curing.

In this step, the provisionally integrated subjects 1A' after the previous step of "the step of adjusting alignment of a stack and provisionally curing the adhesive agent" are placed in the respective drawer units 76 in an open condition and then are closed. Then, the lamp 77 for actual curing is lighted, and the lighting continues for a specified length of time during which the adhesive agent of the provisionally integrated subject 1A' is completely cured. Thereby, the stack 1A is obtained.

(10) As shown in FIG. 23, the stack thus prepared is conveyed to "a step of mounting a transfer plate".

While, in this step of mounting the transfer plate, the equipments used in "the step of adjusting alignment of a stack and provisionally curing the adhesive agent" are utilized, the equipments are provided with unique structures for implementing the above step, and these unique structures are utilized with new related elements.

Figure 31:
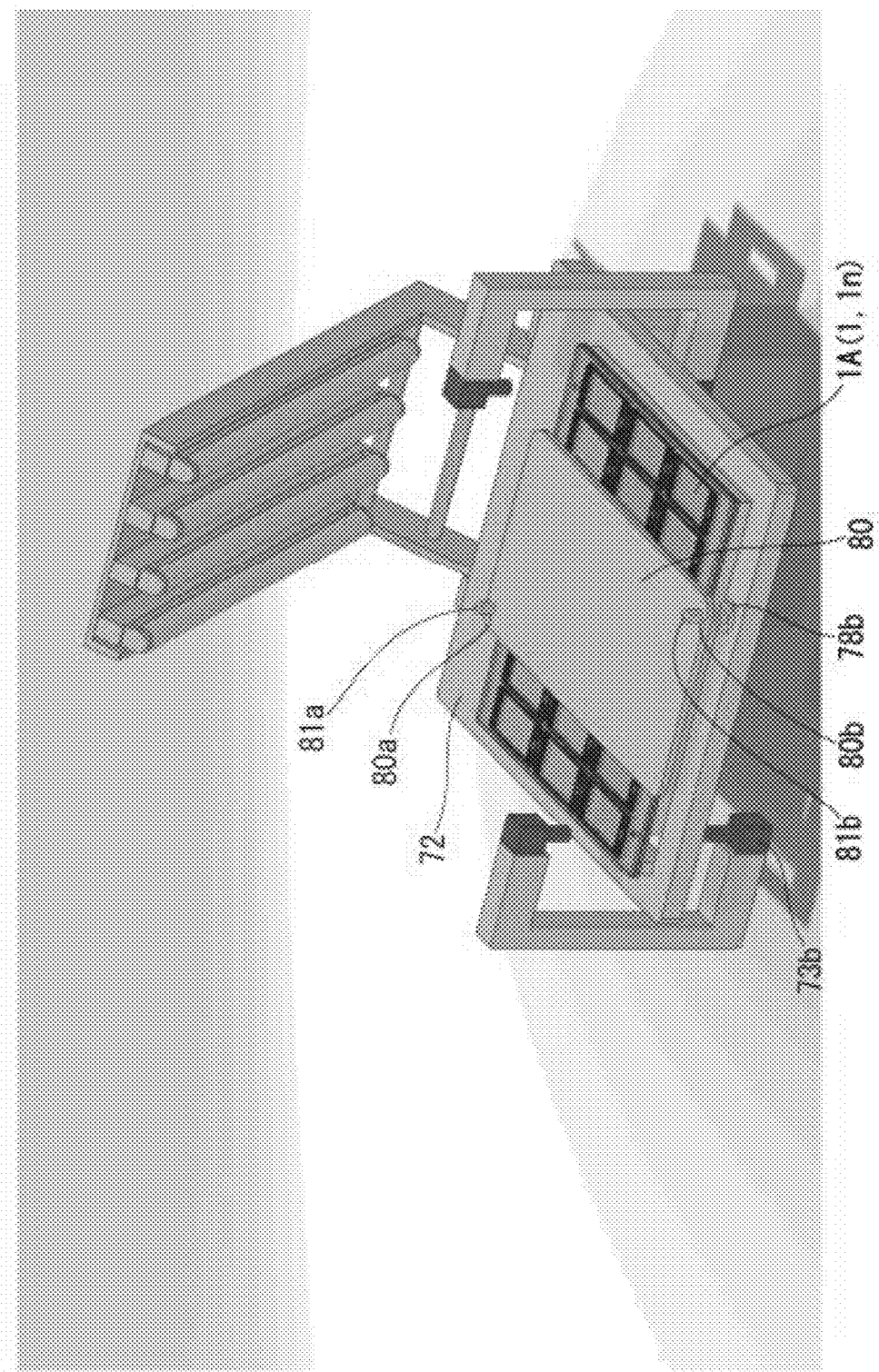
FIG. 31 An explanatory view showing "a step of mounting a transfer plate".

Specifically, cylindrical first and second position-determining cylinders 78a, 78b (position-determination involved elements) are erected on the fourth base table 72 which is one of the equipments, and a transfer plate 80 acting as a transfer element and position-determining pins 81a, 81b are provided (refer to FIGS. 28 and 31).

The first and second position-determining cylinders 78a, 78b are disposed on the both ends in the width direction of the fourth base table 72, and are positioned in the outer region of the large substrate 1 adjusted on the fourth base table 72. In the present embodiment, the first and second position-determining cylinders 78a, 78b are symmetrical in an alternate fashion taking the center of the longitudinal direction of the fourth base table 72 (position-determined large substrate 1) as a standard. As described later, the arrangement position of first and second position-determining cylinders 86a, 86b with respect to the frame-shaped pattern group 50 of the large substrate 1 properly arranged in the jig plate 62 reflects to the arrangement position of the first and second position-determining cylinders 78a, 78b with respect to the frame-shaped pattern group 50 of the large substrate 1 positioned-determined on the fourth base table 72.

The transfer plate 80 is rectangular in a plan view, and its longitudinal direction length is slightly larger than the width direction length of the large substrate 1. The transfer plate 80 includes first and second position-determining apertures 80a, 80b (position-determination relating elements) at the both ends of its longitudinal direction, and the apertures 80a, 80b are positioned at opposing corners of the transfer plate 80. Both of these apertures 80a, 80b correspond to the first and second position-adjusting cylinders 78a, 78b, and when the opening of the cylinder 78a superposes with that of the aperture 80a, the opening of the cylinder 78b superposes with that of the aperture 80b.

The first and second position-determining pins 81a, 81b cooperate with the above the first and second position-determining cylinders 78a, 78b and the first and second position-determining apertures 80a, 80b to determine the position of the transfer plate 80 with respect to the fourth base table 72. At this position determination, the first position-determining pin 81a is inserted into the first position-determining cylinder 78a and the first position-determining aperture 80a, and the second position-determining pin 81b is inserted into the second position-determining cylinder 78b and the second position-determining aperture 80b.

In order to implement this step under the above configuration, at first, the stack 1A is placed on the fourth base table 72, and then, similarly to the above step of adjusting alignment of the stack, the respective position-adjusting marks of the cover glass 1n (the alignment marks of the large substrate 1) are placed, by utilizing the respective bottom side detection cameras 73, on their axis lines. After this position determination, the position-determined stack 1A is suctioned and fixed to the fourth base table 72 by means of a vacuum suction apparatus not shown.

Then, the transfer plate 80 on which the adhesive agent is applied is superposed on the stack 1A (cover glass 1n (uppermost glass)) while the adhesive agent-existing side faces to the stack 1A, and the opening of the first position-determining aperture 80a of the transfer plate 80 is superposed on the opening of the first position-determining cylinder 78a and the opening of the second position-determining aperture 80b is superposed on the opening of the second position-determining cylinder 78b. After this operation, the first position-determining pin 81a is inserted into the first position-determining cylinder 78a and the first position-determining aperture 80a, the second position-determining pin 81b is inserted into the second position-determining cylinder 78b and the second position-determining aperture 80b, and the positioned-determined transfer plate 80 is bonded to the stack 1A (cover glass 1n) (refer to FIG. 31).

In the present embodiment, the adhesive agent which bonds the transfer plate 80 to the stack 1A is different from that which bonds the large substrates 1 with each other. This is because, as described later, the timing at which the transfer plate 80 is separated from the stack 1A is different from that at which the large substrates 1 are separated from each other. The adhesive agent includes, for example, modified acrylate-based adhesive agent configured by acryl resin and an acryl oligomer.

(11) When the transfer plate 80 is bonded to the top surface of the stack 1A, the stack 1A including the bonded transfer plate 80 is conveyed to "the step of the cut processing (dicing processing)".

Figure 32:
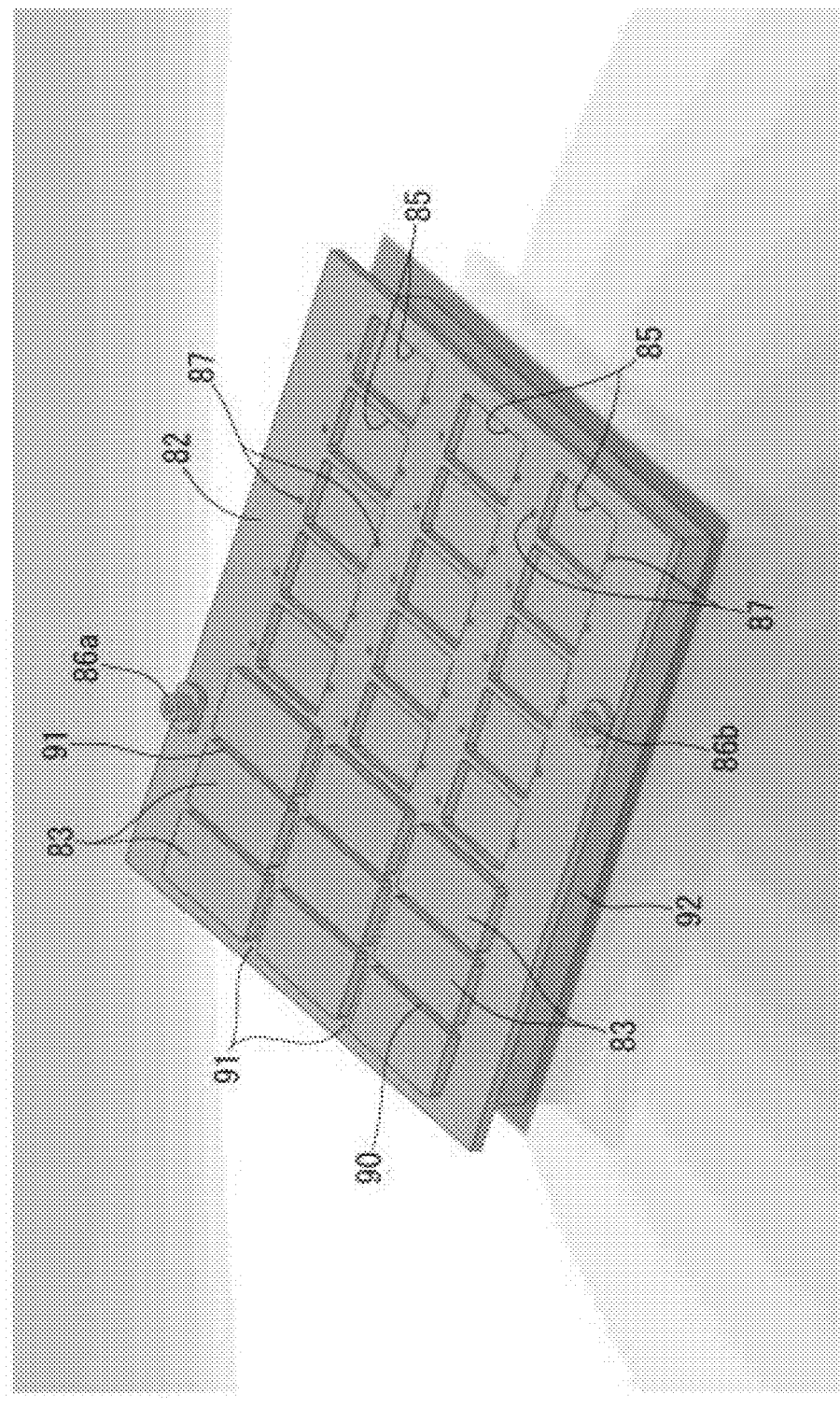
FIG. 32 A perspective view showing a jig plate and a setting jig held in the jig plate.
Figure 35:
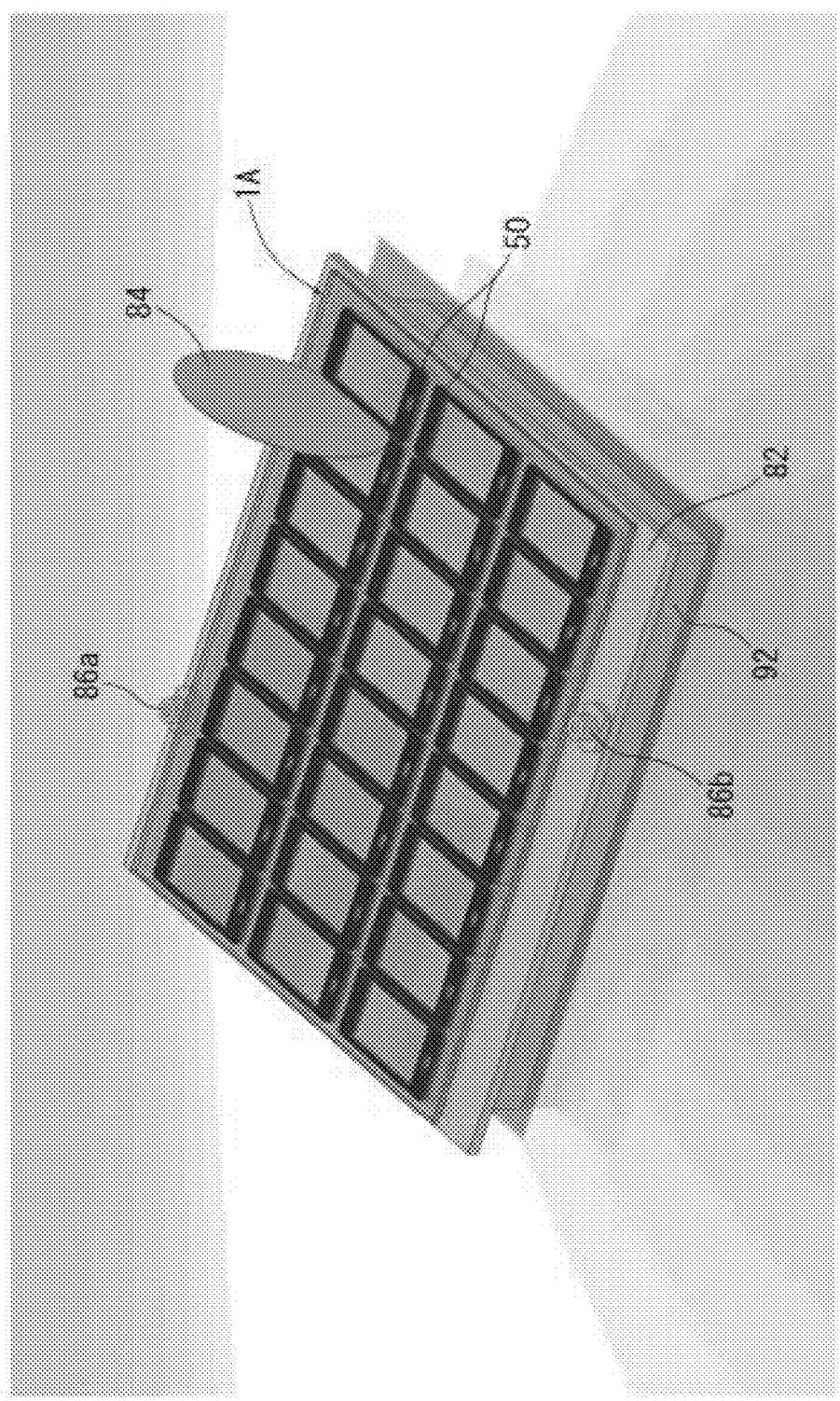
FIG. 35 An explanatory view showing "a step of the cut processing" by means of a dicing plate.

In this step, as shown in FIG. 32, a jig plate 82, a plenty of setting jigs 83 which can be removably held on the jig plate 82, and a dicing blade 84 are provided (refer to FIG. 35).

As shown in FIG. 32, the jig plate 82 is formed rectangular in a plan view, having a similar dimension as those of the first to the fourth base tables 54, 63, 67, 72, and a plenty of concave portions 85, cylindrical first and second position-determining cylinders 86a, 86b and position-determining apertures 87 are formed. The plenty of the concave portions 85 are arranged corresponding to the plenty of the frame-shaped patterns 50 of the large substrate 1 while the planar structures of the respective concave portions 85 are made smaller than the frame-shaped patterns 50, and the concave portions 85 are aligned in a longitudinal direction and a width direction of the jig plate 82 to form a plurality of columns. The first and second position-determining cylinders 86a, 86b are erected on the both ends in the width direction of the jig plate 82, and are symmetrical in an alternate fashion taking the center of the longitudinal direction of the fourth base table 72 as a standard. More specifically, the arrangement positions of the first and second position-determining cylinders 86a, 86b with respect to the frame-shaped pattern group 50 of the large substrate 1 properly arranged on the jig plate 82 are the same as the arrangement positions of the first and second position-determining cylinders 78a, 78b with respect to the frame-shaped pattern group 50 of the large substrate 1 properly arranged on the fourth base table 72. Accordingly, when the opening of the first position-determining cylinder 86a of the first and second position-determining cylinders 86a, 86b is superposed on the first position-determining aperture 80a, the second position-determining aperture 80b of the transfer plate can be superposed on the opening of the second position-determining cylinder 86b. The two position-determining apertures 87 are formed per one concave portion 85 on the jig plate 82, and are arranged to put every concave portion 85 between them in the width direction of the jig plate 82.

Figure 33:
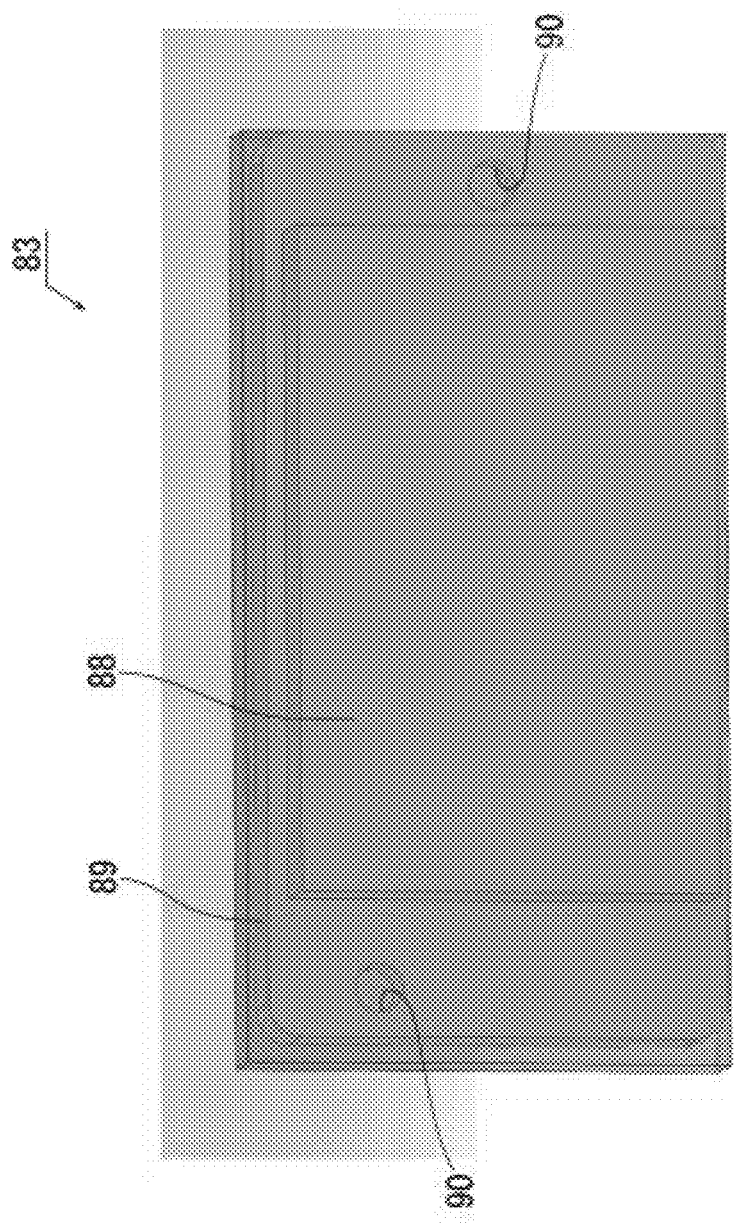
FIG. 33 A view showing the rear surface of the setting jig.
Figure 34:
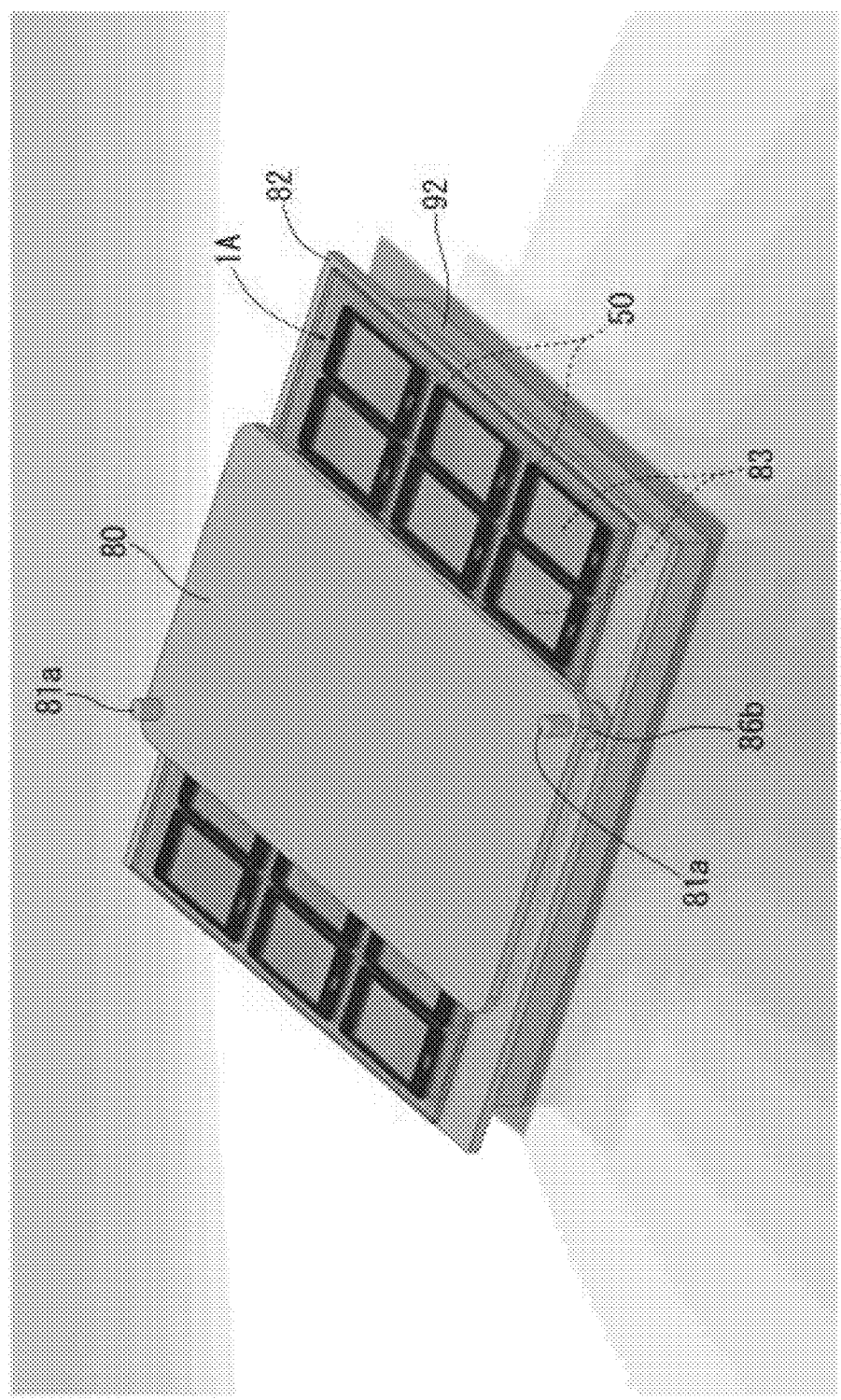
FIG. 34 An explanatory view showing a situation in which the stack is transferred by the transfer plate to the jig plate for a cut processing.

As shown in FIG. 32, the plenty of the setting jigs 83 can be removably inserted into the respective concave portions 85. As shown in FIG. 33, each of the respective setting jigs 83 is provided with an insert concave section 88, a supporting board section 89 having flat surfaces (outer surface and top surface) mounted on the base side of the insert concave section 88, and position-determining apertures 90. The insert concave section 88 is formed corresponding to the dimension of the concave portion 85, and the insert concave section 88 and the concave portion 85 are removably inserted into each other. Accordingly, the insertion between them adjusts the position of the setting jig 83 on the jig plate 82. The supporting board section 89 is formed rectangular in a plan view larger than the insert concave section 88 and slightly smaller than the frame-shaped pattern 50 of the large substrate 1. When the insert concave section 88 is inserted into the concave portion 85, the supporting board section 89 projects from the top surface of the jig plate 82 by its thickness. The two position-determining apertures 90 are formed on the periphery of the rear surface of the supporting board section 89 corresponding to the above position-determining apertures 87 of the jig plate 82. When the insert concave section 88 is inserted into the concave portion 85, the position-determining apertures 90 of the rear surface of the supporting board section 89 and the position-determining apertures 87 of the jig plate 82 are superposed on each other.

When the insert concave sections 88 of the respective setting jigs 83 are inserted into the respective concave portions 85, the surfaces of the supporting board sections 89 of the respective setting jigs 83 form patterns the same as those of the frame-shaped patterns 50 having the somewhat reduced surface areas with respect to the frame-shaped patterns 50. When the large substrate 1 is superposed on the plenty of the setting jigs 83 such that the respective frame-shaped patterns 50 of the large substrate 1 correspond to the respective setting jigs 83 of the jig plate 82, the supporting board sections 89 of the respective setting jigs 83 are accommodated in the bottom regions of the respective frame-shaped patterns 50.

The setting jigs 83 are aligned to form a plurality of columns, and spaces 91 are formed between the adjacent columns so that dicing blade 84 can move into the respective spaces 91 for the cut processing.

As shown in FIG. 32, an electromagnetic chuck 92 is mounted under the jig plate 82 in this embodiment. The electromagnetic chuck 92 is composed of an electrical magnet, and when the setting jigs 83 (insert concave sections 88) are inserted into the respective concave portions 85 of the jig plate 82, and the electromagnetic chuck 92 is activated, the setting jigs 83 are firmly held on the jig plate 82.

The dicing blade 84 (refer to FIG. 35) is used taking the special notice of its acceleration of the cut processing because of its rigidity compared with the shaft-shaped processing device 8 of the ultrasonic vibration processing apparatus 4. The dicing blade 84 includes, for example, a diamond blade. The dicing blade 84 is controlled by a control unit of which a movable driving source is not shown. The control unit drives the dicing blade 84 to cut out the stacked block 1a from the stack 1A based on information such as the position of the jig plate 82, the position of the setting jig 83 on the jig plate 82, the dimension of the setting jig 83, and the spaces 91 between the adjacent setting jigs 83.

Under these configurations, in order to implement this step, at first, the position-determining pins not shown are inserted into the position-determining apertures 87 formed on every concave portion 85 of the jig plate 82, and the position-determining pins are erected on the jig plate 82. Then, the setting jigs 83 are inserted into the respective concave portions 85, and the above position-determining pins are inserted into the position-determining apertures 90 of the setting jigs 83. Then, the electromagnetic chuck 92 is activated to suction the respective setting jigs 83 on the jig plate 82. Thereby, the respective setting jigs 83 are firmly held on the jig plate 82 at the pre-adjusted positions (refer to FIG. 32).

On the other hand, when the respective setting jigs 83 are firmly held on the jig plate 82, the stack 1A is conveyed to the jig plate 82 after the adhesive agent is applied to the bottom surface of the stack 1A to which the transfer plate is bonded. Then, the stack 1A is descended onto the jig plate 82 while the first position-determining aperture 80a of the transfer plate 80 is aligned with the opening of the first position-determining cylinder 86a, and the second position-determining aperture 80b of the transfer plate 80 is aligned with the opening of the second position-determining cylinder 86a, so that the first position-determining pin 81a is inserted into the first position-determining aperture 80a and the first position-determining cylinder 86a, and the second position-adjusting pin 81b is inserted into the second position-determining aperture 80b and the second position-determining cylinder 86b. Thereby, the transfer plate 80 is position-determined with respect to the jig plate 82, and the stack 1A is bonded to the respective setting jigs 83 under the condition that the frame-shaped patterns 50 of the stack 1A are properly arranged on the respective setting jigs 83. This is because that the arrangement positions of the first and second position-determining cylinders 86a, 86b with respect to the group of the plenty of the frame-shaped patterns 50 properly arranged on the plenty of the setting jigs 63 are reflected as the arrangement positions of the first and second position-determining cylinders 86a, 86b with respect to the group of the plenty of the frame-shaped patterns 50 of the stack 1A positioned-determined on the fourth base table 72.

The above-mentioned UV cure adhesive agent is not used as that applied to the bottom surface of the stack 1A to which the transfer plate 80 is bonded in this embodiment. This is because a lamp apparatus for curing the adhesive agent is required near the jig plate 82 in case of using the UV cure adhesive agent. Accordingly, for example, the above-described modified acrylate-based adhesive agent which can be cured without the lamp apparatus for curing is employed.

After the bonding of the stack 1A to which the transfer plate is bonded to the setting jigs 83, the transfer plate 80 is removed from the stack 1A. An external force for breaking the bonding between the transfer plate 80 and the stack 1A is applied for this removal of the transfer plate 80 from the stack 1A. Since the transfer plate 80 is bonded to the uppermost cover glass 1n of the stack 1A, no problem arises if the above cover glass 1n is broken.

Then, as shown in FIG. 35, the cut processing (dicing processing) between the columns of the frame-shaped patterns 50 of the stack 1A is conducted by using the dicing blade 84 in consideration of the spaces 91 between the setting jigs 83. The reason the cut processing is conducted by using the dicing blade 84 is that the rigidity of the dicing blade 84 is higher than that of the shaft-shaped processing device 8 of the ultrasonic vibration processing apparatus 4, and the cut-out of the stacked block 1a (cut-out from the stack 1A: raw plate for final product) from the stack 1A (large substrate 1) by the cut processing by means of the dicing blade 84 is quicker than the cut-off of the stacked block 1a by using the shaft-shaped processing device 8 of the ultrasonic vibration processing apparatus 4.

Figure 36:
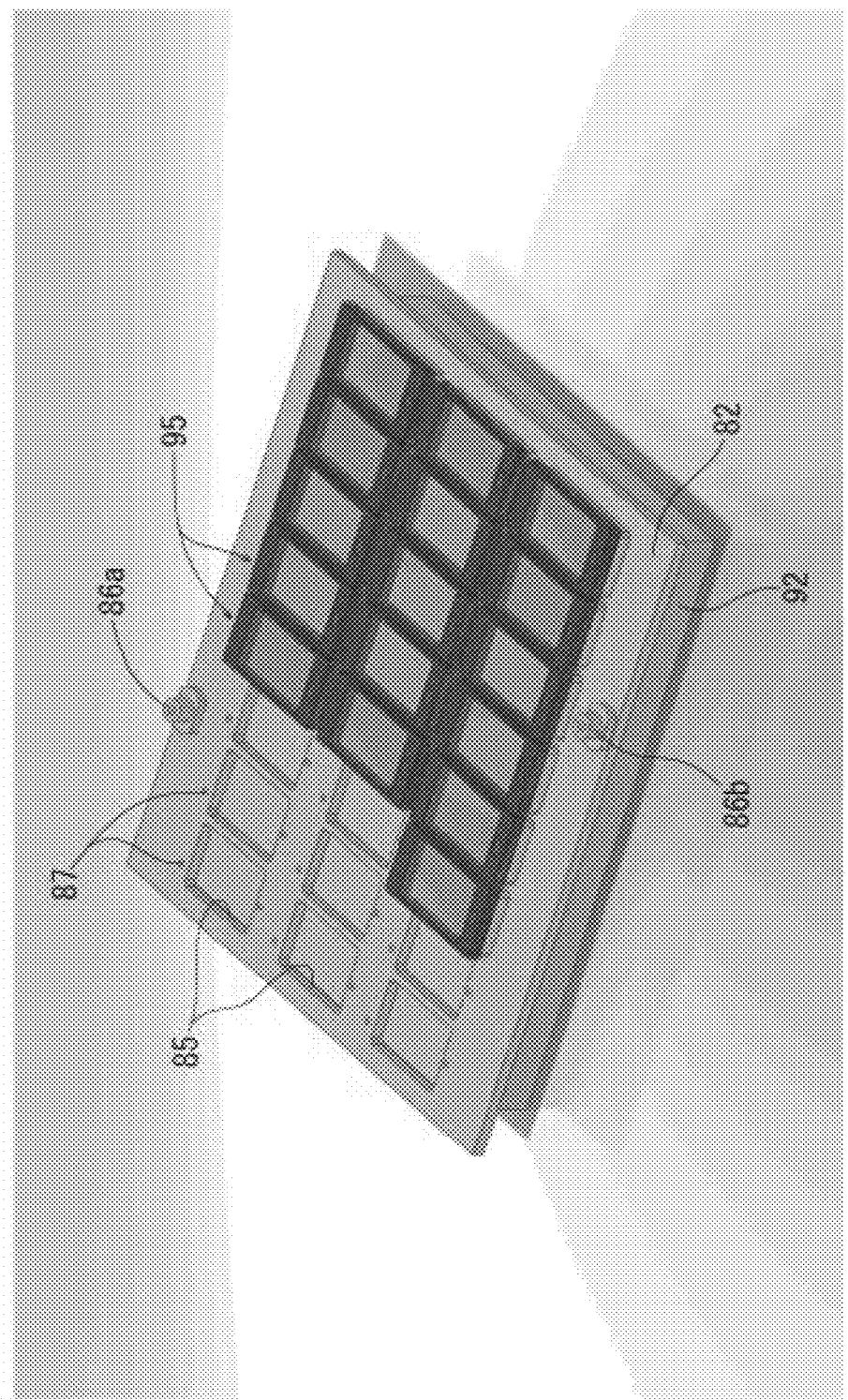
FIG. 36 An explanatory view showing a situation in which part of setting jigs to which a stacked block is adhered is taken out from the jig plate after the completion of "the step of the cut processing" by means of the dicing plate.
Figure 37:
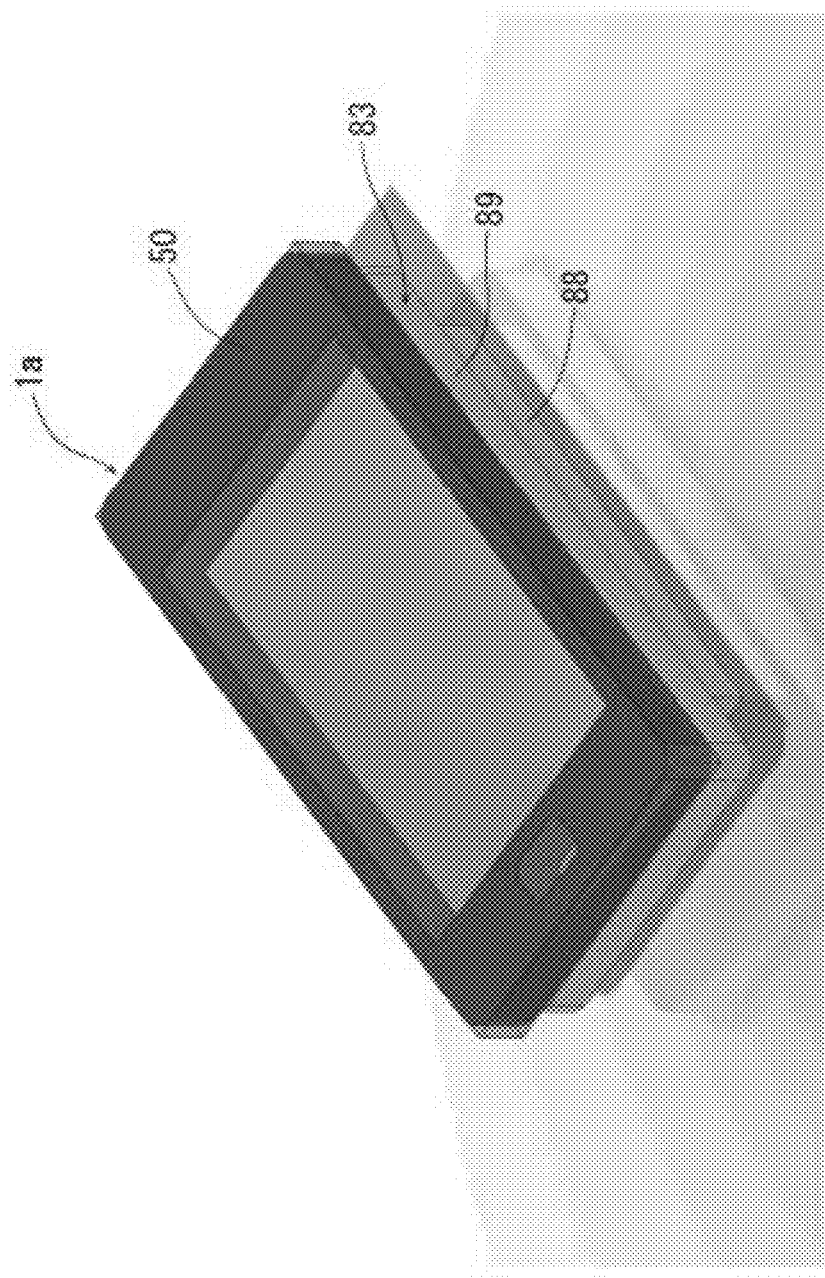
FIG. 37 A perspective view showing the setting jig to which the stacked block is adhered.

As shown in FIGS. 36 and 37, the cut processing cuts out the respective frame-shaped patterns 50 from the stack 1A, and the stacked blocks 1a which are bonded to the top surfaces of the setting jigs 83 are cut out on the respective setting jigs 83.

(12) After the cut-out of the stacked blocks 1a bonded to the setting jigs 83, the stacked blocks 1a are conveyed to "a step of ultrasonic vibration processing", as shown in FIG. 23.

In this step, a jig plate 96 for processing as a base table for processing and the above-mentioned ultrasonic vibration processing apparatus 4 are provided.

The jig plate 96 for processing basically includes the same configuration as that of the above jig plate 82, and the only differences of the jig plates 96 for processing with respect to the jig plate 82 includes that the first and second position-determining cylinders 86a, 86b are omitted, and the spaces between the adjacent concave portions 85 are broadened so that, when the setting jigs 83 to which the stacked block 1a is bonded is inserted into the concave portion 85, the specified space 97 is secured for enabling the ultrasonic vibration processing between the adjacent stacked blocks 1a. Accordingly, the constituents the same as those of the jig plate 82 are attached the same numerals, and the description thereof will be omitted.

As described in detail, the ultrasonic vibration apparatus 4 is equipped with not only the elevating apparatus 10 (refer to FIG. 10) for moving up and down the housing 6 in the vertical direction but also an apparatus (not shown) for moving the housing 6 including the elevating apparatus 10 from front to back and from side to side. The movement of this moving apparatus and the moving up and down of the elevating apparatus 10 are controlled by the control unit U (refer to FIG. 3) based on the set contents in consideration of the information regarding the setting jig 83 mounted on the jig plates 96 for processing, and the stacked block 1a bonded on the setting jig 83.

Figure 38:
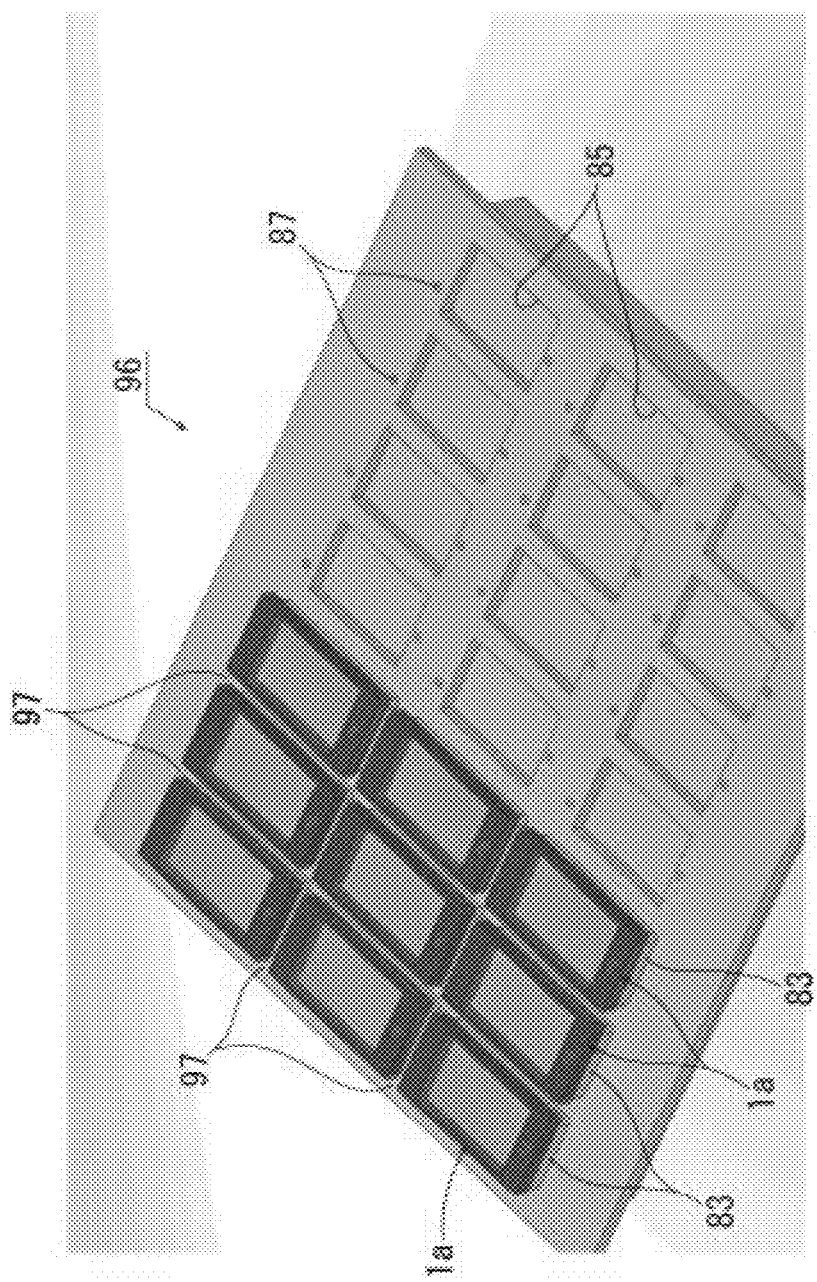
FIG. 38 An explanatory view showing a situation in which the setting jig to which the stacked block is adhered is held on the jig plate for the processing for conducting an ultrasonic vibration processing.

As shown in FIGS. 36 and 38, in order to implement this step under the above configuration, the setting jigs 83 to which the cut-out stacked blocks 1a are bonded are removed from the jig plate 82, and set in the respective concave portions 85 of the jig plates 96 for processing (the insert concave sections 88 are inserted into the concave portions 85). Then, the respective setting jigs 83 are firmly held on the jig plates 96 for the processing by means of the electromagnetic chuck 92.

Figure 39:
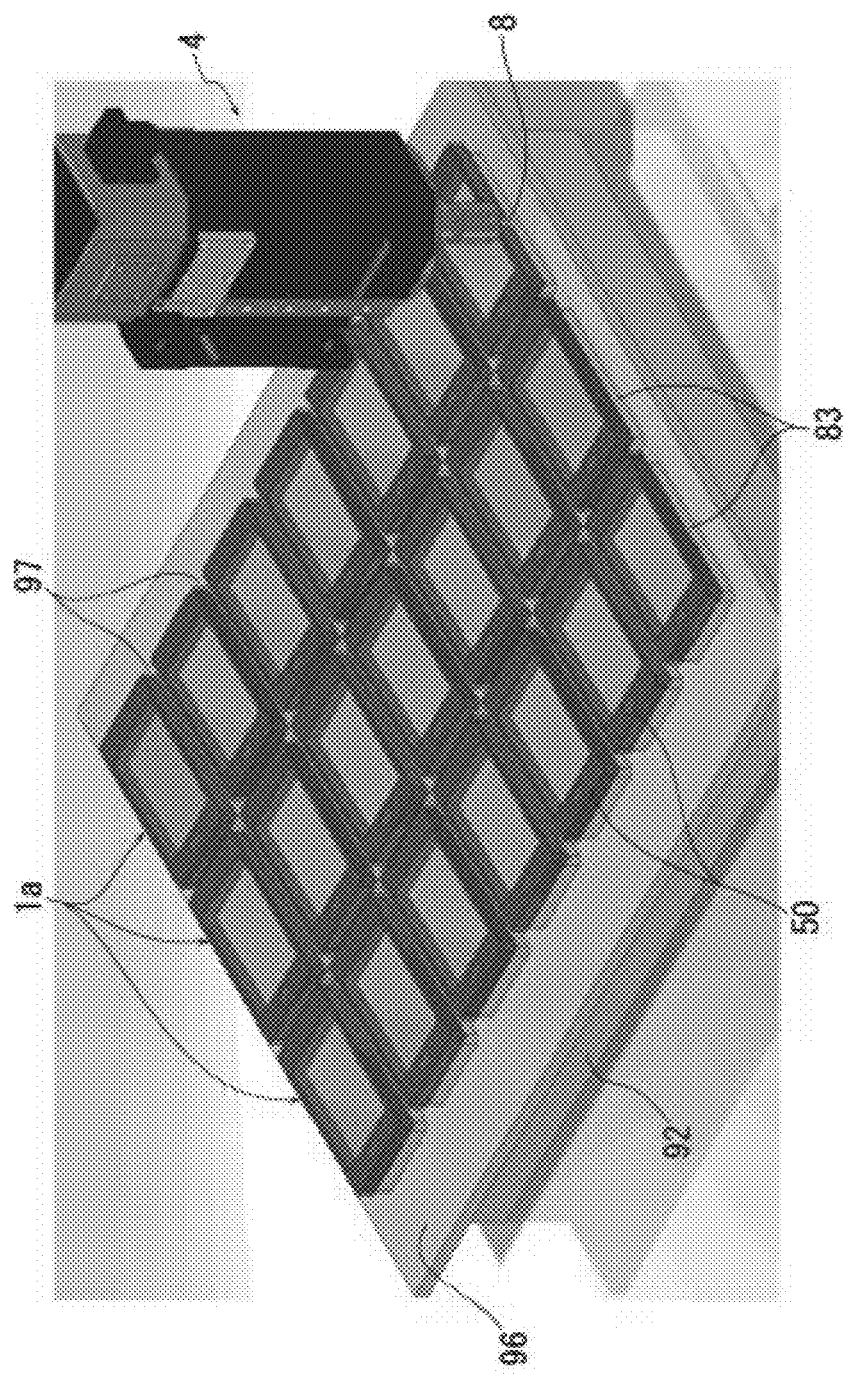
FIG. 39 An explanatory view showing "a step of the ultrasonic vibration processing".

As shown in FIG. 39, under this condition, the processing (including finish processing) of formation of apertures to the stacked block 1a and the processing (including finish processing) of the outer peripheral surface of the stacked block 1a are conducted by using the ultrasonic vibration apparatus 4.

After the completion of the processing by the ultrasonic vibration apparatus 4, the setting jig 83 to which the stacked block 1a is bonded is conveyed to "a step of exfoliation", as shown in FIG. 23. It is required to exfoliate the cover glass 1n from the product glass and to exfoliate the product glasses from each other for obtaining product glasses (product) in addition to exfoliating the stacked block 1a from the setting jig 83.

Therefore, in this step, at first, an external force is applied to the stacked block 1a from the setting jig 83 for the exfoliation. Then, the stacked block 1a is introduced to a hot bath filled with warm water for dissolving the adhesive agent of the stacked block 1a for supplying the product glass as a product.

Accordingly, since the stacked block 1a is cut out by the cut processing of the stack 1A by use of the dicing blade 84 in the above embodiment, the stacked block 1a can be cut out quicker than the case in which the stacked block 1a is cut out by using the shaft-shaped processing device 8 of the ultrasonic vibration processing apparatus 4. Since, on the other hand, the outer peripheral surface of the stacked block 1a is processed and finally processed by using the shaft-shaped processing device 8 of the ultrasonic vibration processing apparatus 4, the chipping, if generated on the outer peripheral surface of the stacked block 1a by the cut processing by use of the dicing blade 84, is repaired by the basically-conducted processing of the processing device 8 of the ultrasonic vibration processing apparatus 4. Accordingly, a length of time required for the production of one sheet of the glass can be shortened as much as possible while the quality of the product glass is secured.

The plenty of the setting jigs 83 can be regularly arranged on the specified positions of the jig plate 82, and the large substrate can be bonded to the plenty of the setting jigs 83 while the respective frame-shaped patterns 50 of the large substrate 1 are properly arranged on the respective setting jigs 83 by using the transfer plate 80. Accordingly, the cut processing by the dicing plate 84 can be performed as the repetition of simple operations so that the same stacked blocks 1a can be reliably cut out from the large substrate 1 and the control of the cut processing by the dicing blade 84 can be simplified.

In this case, the respective frame-shaped patterns 50 of the large substrate 1 can be properly arranged on the setting jigs 83 by using only the transfer plate 80 and the position-determining cylinders 78a, 78b, 86a, 86b without use of cameras and sensors to eliminate the need of complex and expensive equipment. The highly durable equipment can be used because the equipment does not go wrong different from the cameras and sensors.

The setting jigs 83 to which the above stacked blocks 1a are bonded are held in the regular concave portions 85 of the jig plates 96 for processing so that the stacked blocks 1a having the same shapes are regularly aligned on the jig plates 96, and the regular operation of the ultrasonic vibration processing apparatus 4 can be possible. Accordingly, also the control of the ultrasonic vibration processing apparatus 4 can be simplified.

While the embodiments have been described, the present invention includes the following aspects.

(1) Under the configuration of another feature of the invention, the target amplitude is set to be a specified amplitude in a range from 3 μm to 9 μm, and the target frequency is set to be a specified frequency in a range from 60 kHz to 64 kHz. The preferable and specific amplitude and frequency in view of the processing accuracy of the tempered glass can be provided based on the knowledge the present inventor has obtained.

In this case, the reasons why the target amplitude is set in the range from 3 μm to 9 μm are that the cracks and the chippings over a specified degree are generated due to the insufficient processing ability (due to the increase of the cutting resistance occurring by the remaining of the cutting scrap) under 3 μm and that the possibility of generating the cracks and the chippings over a specified degree in the tempered glass is increased because the tempered glass cannot follow the stress change generated therein during the processing over 9 μm. The reasons why the target vibration frequency is set in the range from 60 kHz to 64 kHz is that the cracks are generated due to the insufficient processing ability under 60 kHz similarly to the case of the target amplitude, and that the possibility of generating the cracks is increased because the tempered glass cannot follow the stress change generated therein during the processing over 64 kHz.

(2) Under the configuration of another feature of the invention, the rotation number of the processing device is set to be a specified rotation number in a range from 2000 rpm to 30000 rpm. Thereby, based on the knowledge of the present inventor, the rotation number of the processing device is made preferable under the above-identified vibration condition in view of processing the tempered glass having the surface reinforced layer with the high strength.

In this case, the reasons why the rotation number of the processing device is set in the range from 2000 rpm to 30000 rpm are that the processing effects on the tempered glass are insufficient below 2000 rpm and that the processing effect is reduced by the occurrence of a slip phenomenon (reduction of processing resistance) on the processed surface over 30000 rpm, thereby generating the problem of durability.

DESCRIPTION OF SYMBOLS

1 . . . large substrate (tempered glass)
1A . . . stack (large substrate)
1a . . . stacked block
1n . . . cover glass
3 . . . surface reinforced glass
4 . . . ultrasonic vibration processing apparatus
7 . . . vibration apparatus (vibration mechanism)
8 . . . processing device
50 . . . frame-shaped patterns
51 . . . alignment mark (position-adjusting mark)
53 . . . position-adjusting mark
72 . . . fourth base table (adjusting table)
73a . . . detection camera (position-adjusting section)
73b . . . detection camera (position-adjusting section)
78a . . . first position-adjusting cylinder (position-determination involved element)
78b . . . second position-adjusting cylinder (position-determination involved element)
80 . . . transfer plate (transfer element)
80a . . . first position-determining aperture (position-determination relating element)
80b . . . second position-determining aperture (position-determination relating element)
82 . . . jig plate (base table for cut processing)
83 . . . setting jig (individual base)
84 . . . dicing blade
86a . . . first position-determining cylinder (position-determination involved element)
86b . . . second position-determining cylinder (position-determination involved element)

91 . . . space
96 . . . jig plate for processing (base table for processing)
U . . . control unit (control means)

The invention claimed is:

1. A method of processing a chemical tempered glass for processing a raw plate for a product of the chemical tempered glass having a surface reinforced layer by using a processing device which is rotated and vibrated, the method comprising:
　cutting out the raw plate for the product from a large substrate acting as the chemical tempered glass having the surface reinforced layer by using a dicing plate prior to the processing by the processing device to the raw plate for the product; and
　conducing a finish processing to an outer peripheral surface of the raw plate for the product, with the processing by the processing device to the raw plate for the product,
　wherein, while vibration by the processing device to the raw plates for the product as the tempered glass is feed-back-controlled such that an amplitude and a frequency of the processing device approach to a target amplitude and a target frequency of the processing device, respectively, values of the target amplitude and the target frequency are set to change at respective positions in a direction of thickness of the raw plate for product accompanied with the processing of the raw plate for product, which do not belong to a range of generating quality degradation; and
　the feedback control is carried out at every sample frequency of 0.3 msec or less.

2. A method of processing a chemical tempered glass for processing a raw plate for a product of the chemical tempered glass having a surface reinforced layer by using a processing device which is rotated and vibrated, the method comprising:
　cutting out the raw plate for the product from a large substrate acting as the chemical tempered glass having the surface reinforced layer by using a dicing plate prior to the processing by the processing device to the raw plate for the product;
　conducing a finish processing to an outer peripheral surface of the raw plate for the product, with the processing by the processing device to the raw plate for the product; and
　the method further comprising, during the cut-off of the raw plates for the product from the large substrate and the processing by the processing device to the raw plates for the product:
　providing a base table for cut processing which removably holds a plurality of aligned individual bases having spaces therebetween on its top surface, and a base table for processing which removably holds, on its top surface, the plurality of the aligned individual bases having wider spaces than the above spaces between the adjacent individual bases on the base table for cut processing;
　at first, mounting the above large substrate on top surfaces of the plurality of the individual bases for covering the individual bases after the individual bases are held on the base table for cut processing;
　then, cutting the above large substrate at a region above the spaces between the adjacent individual bases of the base table for cut processing such that the above respective raw plates for the product are cut out under a situation that they are mounted on the top surfaces of the individual bases;
　then, holding the respective individual bases to which the raw plates for the product on the base table for processing;
　then, processing the raw plates for the product on the respective individual bases on the base table for processing for forming product glasses on the respective individual bases; and
　thereafter, removing the respective product glasses from the respective individual bases.

3. The method of processing the tempered glass as claimed in claim 2 further comprising:
　providing the large substrate on which a frame-shaped patterns group is superposed on and matched with the plurality of the individual bases, and a plurality of position-determining marks having specified positional relations with the frame-shaped patterns group are printed under a situation that the respective individual bases are held on the base table for cut processing;
　providing the base table for cut processing including a plurality of position-determining parts which have specified positional relations with respect to the frame-shaped patterns group of the large substrate superposed on and matched with the plurality of the individual bases under a situation that the plurality of the individual bases are held;
　further providing an adjusting base table and a transfer element;
　wherein the adjusting base table includes a surface of placing the large substrate, a plurality of position-determining parts position-determined with the plurality of the position-determining marks of the large substrate placed on the surface thereof, and position-determination involved elements in which a positional relation with respect to the frame-shaped patterns group of the large substrate under a situation that the plurality of the respective position-determining marks are position-determined with the plurality of the position-determining parts is same as a positional relation of the plurality of the position-determining parts with respect to the frame-shaped patterns group of the large substrate superposed and matched on the plurality of the individual bases on the base table for cut processing; and
　wherein the transfer element includes a plurality of position-determination relating elements for establishing a position-determining relation with respect to the plurality of the position-determining parts and the plurality of the position-determination involved elements; and
　position-determining the plurality of the respective position-determining marks of the large substrate with respect to the plurality of the position-determining parts by placing the large substrate on the position-determining marks on the adjusting base table;
　then, mounting the transfer element to the large substrate on the adjusting base table under a situation that the plurality of the respective position-determining marks and the plurality of the position-determining parts are position-determined with each other while keeping a situation that the plurality of position-determination relating elements and the position-determination involved elements are position-determined with each other;
　then, conveying the large substrate on which the transfer element is mounted to the position-determination involved elements of the base table for cut processing, and mounting the large substrate to the plurality of the individual bases held on the base table for cut processing while keeping the situation that the plurality of position-determination relating elements of the transfer element and the position-determination involved elements of the base table for cut processing are position-determined with each other; and thereafter, removing the transfer element from the large substrate.

4. The method of processing the tempered glass as claimed in claim 3, wherein an adhesive agent is used for mounting the transfer element to the large substrate.

5. The method of processing the tempered glass as claimed in claim 4 further comprising:

bonding a cover glass to the large substrate before the transfer element is bonded to the large substrate; and bonding the transfer element to the large substrate through the cover glass.

6. The method of processing the tempered glass as claimed in claim 5, wherein an adhesive agent which is soluble in warm water is used for bonding the cover glass to the large substrate.

7. The method of processing the tempered glass as claimed in claim 3, wherein a stack prepared by bonding the frame-shaped patterns group of the large substrate is used, as the large substrate, after the plurality of the large substrates are stacked, and the plurality of the position-determining marks of the respective large substrates of the stack and the plurality of the position-determining parts of the adjusting base table are position-determined for forming the stack.

8. The method of processing the tempered glass as claimed in claim 7, wherein the position-determining parts of the adjusting base table are configured by a pair of detection cameras disposed on an axis line vertically extending;

the respective large substrates configuring the stack are bonded with each other by utilizing an adhesive agent cured with specified radiation rays; and while the position-determining mark of the large substrate positioned at a lowermost position is placed on the axis line of the bottom side detection camera for forming the stack, the specified radiation rays are radiated to the adhesive agent positioned between the stacked large substrate and the large substrate lying immediately below after the position-determining mark of the large substrate is positioned on the axis line of the top side detection camera at every stack for the large substrates stacked on an lowermost large substrate.

9. The method of processing the tempered glass as claimed in claim 2, wherein, while vibration by the processing device to the raw plates for the product as the chemical tempered glass is feed-back-controlled such that an amplitude and a frequency of the processing device approach to a target amplitude and a target frequency of the processing device, respectively, values of the target amplitude and the target frequency are set to change at respective positions in a direction of thickness of the raw plate for product accompanied with the processing of the raw plate for product, which do not belong to a range of generating quality degradation; and the feedback control is carried out at every sample frequency of 0.3 msec or less.

\* \* \* \* \*